US008862690B2

(12) United States Patent
Sacco et al.

(10) Patent No.: US 8,862,690 B2
(45) Date of Patent: *Oct. 14, 2014

(54) SYSTEM AND METHOD FOR CREATING TOPIC NEIGHBORHOOD VISUALIZATIONS IN A NETWORKED SYSTEM

(75) Inventors: Nathan Sacco, San Jose, CA (US); Ryan Melcher, Ben Lomond, CA (US)

(73) Assignee: eBay Inc., San Jose, CA (US)

( * ) Notice: Subject to any disclaimer, the term of this patent is extended or adjusted under 35 U.S.C. 154(b) by 790 days.

This patent is subject to a terminal disclaimer.

(21) Appl. No.: 11/961,030

(22) Filed: Dec. 20, 2007

(65) Prior Publication Data

US 2009/0089678 A1 Apr. 2, 2009

Related U.S. Application Data

(60) Provisional application No. 60/976,062, filed on Sep. 28, 2007, provisional application No. 60/978,331, filed on Oct. 8, 2007.

(51) Int. Cl.

| G06F 15/16 | (2006.01) |
| G06F 15/173 | (2006.01) |
| G06Q 30/02 | (2012.01) |
| G06F 17/30 | (2006.01) |

(52) U.S. Cl.
CPC .......... *G06F 17/3089* (2013.01); *G06Q 30/02* (2013.01)
USPC ............................ 709/217; 709/219; 709/224

(58) Field of Classification Search
CPC ............... G06Q 30/02; G06Q 30/0255; G06F 17/30867; G06F 17/30864; G06F 17/30873; G06F 17/3089

USPC ................. 709/204, 205, 229, 238, 217–219, 709/201–203, 224; 707/104.1, 736–738, 707/776

See application file for complete search history.

(56) References Cited

U.S. PATENT DOCUMENTS

| 6,035,332 | A  | * | 3/2000  | Ingrassia et al. ............... 709/224 |
| 6,581,096 | B1 | * | 6/2003  | Cottrille et al. ............... 709/223 |
| 6,721,780 | B1 | * | 4/2004  | Kasriel et al. ................. 709/203 |
| 7,117,208 | B2 | * | 10/2006 | Tamayo et al. ............... 707/777 |
| 7,356,572 | B2 | * | 4/2008  | Jiang et al. .................... 709/217 |
| 7,512,678 | B2 | * | 3/2009  | Crabtree et al. ............... 709/224 |
| 7,610,287 | B1 | * | 10/2009 | Dean et al. .......................... 1/1 |
| 7,613,685 | B2 | * | 11/2009 | Jaepel et al. ......................... 1/1 |
| 7,827,055 | B1 | * | 11/2010 | Snodgrass et al. ......... 705/14.73 |

(Continued)

OTHER PUBLICATIONS

Davies et al., 'Information agents for teh World Wide Web', in Lecture Notes in Computer Science, 1997, vol. 1198/1997, pp. 79-99.*

(Continued)

*Primary Examiner* — Catherine Thiaw
(74) *Attorney, Agent, or Firm* — Schwegman Lundberg & Woessner, P.A.

(57) ABSTRACT

A computer-implemented system and method for creating topic neighborhoods and a visualization for related topic neighborhoods in a networked system are disclosed. The apparatus in an example embodiment includes a neighborhood generator configured to receive an explicit identification of a topic for association with a neighborhood; create a neighborhood in association with the explicitly identified topic; gather neighborhood information related to the neighborhood from sources related to the topic; and provide access to the neighborhood via a neighborhood visualization on a webpage.

11 Claims, 10 Drawing Sheets

(56) References Cited

U.S. PATENT DOCUMENTS

| | | | |
|---|---|---|---|
| 7,953,750 B1* | 5/2011 | Gupta | 707/769 |
| 8,005,832 B2* | 8/2011 | Andrieu | 707/731 |
| 8,060,463 B1* | 11/2011 | Spiegel | 707/609 |
| 8,352,549 B2* | 1/2013 | Sacco et al. | 709/204 |
| 2001/0021914 A1* | 9/2001 | Jacobi et al. | 705/8 |
| 2001/0029506 A1* | 10/2001 | Lee et al. | 707/102 |
| 2001/0054087 A1* | 12/2001 | Flom et al. | 709/218 |
| 2002/0059166 A1* | 5/2002 | Wang et al. | 707/1 |
| 2002/0059379 A1* | 5/2002 | Harvey et al. | 709/205 |
| 2003/0005134 A1* | 1/2003 | Martin et al. | 709/229 |
| 2003/0101214 A1* | 5/2003 | Kumhyr et al. | 709/203 |
| 2004/0059708 A1* | 3/2004 | Dean et al. | 707/1 |
| 2004/0267815 A1* | 12/2004 | De Mes | 707/104.1 |
| 2005/0198128 A1 | 9/2005 | Anderson et al. | |
| 2005/0216528 A1* | 9/2005 | Cheng | 707/202 |
| 2006/0004763 A1* | 1/2006 | Horvitz et al. | 707/9 |
| 2006/0026593 A1* | 2/2006 | Canning et al. | 718/100 |
| 2006/0069699 A1* | 3/2006 | Smadja et al. | 707/104.1 |
| 2006/0194186 A1 | 8/2006 | Nanda | |
| 2006/0195442 A1* | 8/2006 | Cone et al. | 707/5 |
| 2006/0224552 A1* | 10/2006 | Riezler et al. | 707/1 |
| 2007/0005646 A1* | 1/2007 | Dumais et al. | 707/104.1 |
| 2007/0073704 A1* | 3/2007 | Bowden et al. | 707/10 |
| 2007/0106627 A1* | 5/2007 | Srivastava et al. | 706/20 |
| 2007/0168465 A1* | 7/2007 | Toppenberg et al. | 709/218 |
| 2007/0180408 A1* | 8/2007 | Rusu et al. | 715/855 |
| 2007/0185858 A1* | 8/2007 | Lu et al. | 707/5 |
| 2007/0198506 A1 | 8/2007 | Attaran Rezaei et al. | |
| 2007/0245035 A1* | 10/2007 | Attaran Rezaei et al. | 709/238 |
| 2007/0282693 A1* | 12/2007 | Staib et al. | 705/26 |
| 2007/0282987 A1* | 12/2007 | Fischer et al. | 709/223 |
| 2008/0021889 A1* | 1/2008 | Nam et al. | 707/3 |
| 2008/0034058 A1* | 2/2008 | Korman et al. | 709/217 |
| 2008/0082607 A1 | 4/2008 | Sastry et al. | |
| 2008/0134042 A1* | 6/2008 | Jankovich | 715/733 |
| 2008/0168117 A1* | 7/2008 | Coates et al. | 709/201 |
| 2008/0168175 A1* | 7/2008 | Tran | 709/229 |
| 2009/0089372 A1 | 4/2009 | Sacco et al. | |

OTHER PUBLICATIONS

Michael Pazzani, Jack Muramatsu, Daniel Billsus: "Syskill & Webert: idnetifying interesting web sites", AAAI Technical Report, 1996, pp. 69-77.*

U.S. Appl. No. 11/961,017, Non-Final Office Action mailed Oct. 1, 2009, 22 pgs.

U.S. Appl. No. 11/961,017, Response filed Mar. 1, 2010 to Non Final Office Action mailed Oct. 1, 2009, 14 pgs.

U.S. Appl. No. 11/961,017, Final Office Action mailed Jun. 7, 2010, 15 pgs.

U.S. Appl. No. 11/961,017, Response filed Oct. 7, 2010 to Final Office Action mailed Jun. 7, 2010, 15 pgs.

U.S. Appl. No. 11/961,017, Non Final Office Action mailed Aug. 17, 2011, 30 pgs.

U.S. Appl. No. 11/961,017, Final Office Action mailed Mar. 29, 2012, 34 pgs.

U.S. Appl. No. 11/961,017, Notice of Allowance mailed Sep. 7, 2012, 8 pgs.

U.S. Appl. No. 11/961,017, Response filed Jul. 30, 2012 to Final Office Action mailed Mar. 29, 2012, 15 pgs.

U.S. Appl. No. 11/961,017, Response filed Dec. 19, 2011, to Non-Final Office Action mailed Aug. 17, 2011, Dec. 19, 2011.

* cited by examiner

FIG. 4

Add Content
Build the page you want y=the world to see by adding and removing content modules. We can help you start a blog, write a review or a guide if you don't already have one.

Your Modules
The following modules are publicly visible

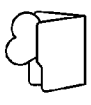
Blog
Start communicating with the community.
Remove | Edit

Listings
Show everyone what you are selling.
Remove | Edit

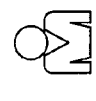
Bio
Tell community about yourself.
Remove | Edit

More Modules
Add more modules for a better My World

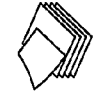
My Neighborhoods
Add you favorite neighborhoods.
Add ~505

Guest Book
Let the community have their say...about you!
Add

Return to My World page

*FIG. 5*

SYSTEM AND METHOD FOR CREATING TOPIC NEIGHBORHOOD VISUALIZATIONS IN A NETWORKED SYSTEM

CROSS-REFERENCE TO RELATED PATENT APPLICATIONS

This non-provisional patent application claims the benefit of the filing date of U.S. Provisional Patent Application Ser. No. 60/976,062, filed Sep. 28, 2007, and entitled, "SYSTEM AND METHOD FOR CREATING TOPIC NEIGHBORHOODS IN A NETWORKED SYSTEM", the content of which is incorporated by reference herein.

This non-provisional patent application claims the benefit of the filing date of U.S. Provisional Patent Application Ser. No. 60/978,331, filed Oct. 8, 2007, and entitled, "RELATED TOPIC NEIGHBORHOOD VISUALIZATION IN A NETWORKED SYSTEM", the content of which is incorporated by reference herein.

BACKGROUND

1. Technical Field

This disclosure relates to networked systems. More particularly, the present disclosure relates to creating topic neighborhoods and a visualization for related topic neighborhoods in a networked system.

2. Related Art

Existing search engines generally use keyword-based categorization, indexing, matching, presenting, navigating, ranking, and managing a plurality of documents. Ranking algorithms generally establish a simple ordering of the documents retrieved in response to a query. Documents appearing at the top of this ordering are considered to be more likely to be relevant. Different global and local ranking schemes have been used to establish documents such as web pages that are relevant to the likelihood of user's needs. These methods include variations of the page rank algorithm, which establishes a global ranking based on links to and from web pages, simulates a random browsing of internet and estimates the likelihood that a user, by random navigation, can arrive at a particular page. While such methods can provide a global score of potential user viewing behavior, it does not take into account the cognitive aspect of content and knowledge associated with web pages. Some approaches have been used to attribute local importance to pages. However, these approaches require an initial query result against which the relevance of the related pages in World Wide Web or document databases can be measured. One of the primary drawbacks of this method is that it has to be carried out in real time; i.e. after a query has been submitted made and a set of results obtained, the algorithm attempts to crawl the neighborhood of these results in real-time to find related pages. Moreover these methods do not detect cases where a node has exerted "undue influence" on the computation of scores, and documents in a community, i.e., the relevant documents, are not ranked.

The most popular method of context creation is through manual grouping of relevant content that can be manifested in directories or any other manual link and content listing. However, these listings can quickly become obsolete due to the dynamic nature of the World Wide Web and the scale of data can also render manual editing of data impracticable or inefficient.

Current search engine and information retrieval systems allow users to personalize and share their keyword searches within their online social/professional networks, and also enable users to add tags and additional information on search results. Often these results are summarized as single URLs or via access to a manually generated list of relevant links. This approach has many fundamental problems, namely knowledge is mostly a collection of related documents and contents, and not single documents and contents. Moreover, the same content can appear in multiple knowledge bases with different relevancies, and a knowledge base may comprise a dynamic set of documents, i.e., a document over time may lose its importance to a knowledge context and new documents may become more relevant. Thus, static lists of documents provide an inefficient means for sharing information. People would prefer to share knowledge and not keywords or single documents.

United States Patent Application No. 20070198506 discloses methods and systems for creating, managing, searching, personalizing, and monetizing a knowledge system defined over a corpus of digital content. Systems and methods are described in which a user can initiate in-depth searches of subject matter and can browse, navigate, pinpoint, and select relevant contexts, concepts, and documents to gain knowledge. Systems and methods are described in which knowledge can be personalized through tagged, personalized context, and personalized context can be shared within social and professional networks, securely and confidentially and with the desired access control. Systems and methods are described in which products and services can be advertised in context and advertising can be selected through a bidding process. Systems and methods are described by which a user can navigate contexts and concepts to obtain relevant information, products and services.

However, current systems do not provide a means for aggregating a collection of knowledge bases and communication channels that can be shared among a set of users who share an interest in a particular topic.

Thus, a computer-implemented system and method for creating topic neighborhoods and a visualization for related topic neighborhoods in a networked system is needed.

BRIEF DESCRIPTION OF THE DRAWINGS

Embodiments illustrated by way of example and not limitation in the figures of the accompanying drawings, in which:

FIG. 4 illustrates an example screenshot of a neighborhood page showing a set of available neighborhoods with associated neighborhood information accessed via a tab on a page provided access to a user's saved information.

FIG. 5 illustrates an example of a My World page that can include a My World: Add Content function to enable the user to create a link to a neighborhood.

DETAILED DESCRIPTION

Figure 1:
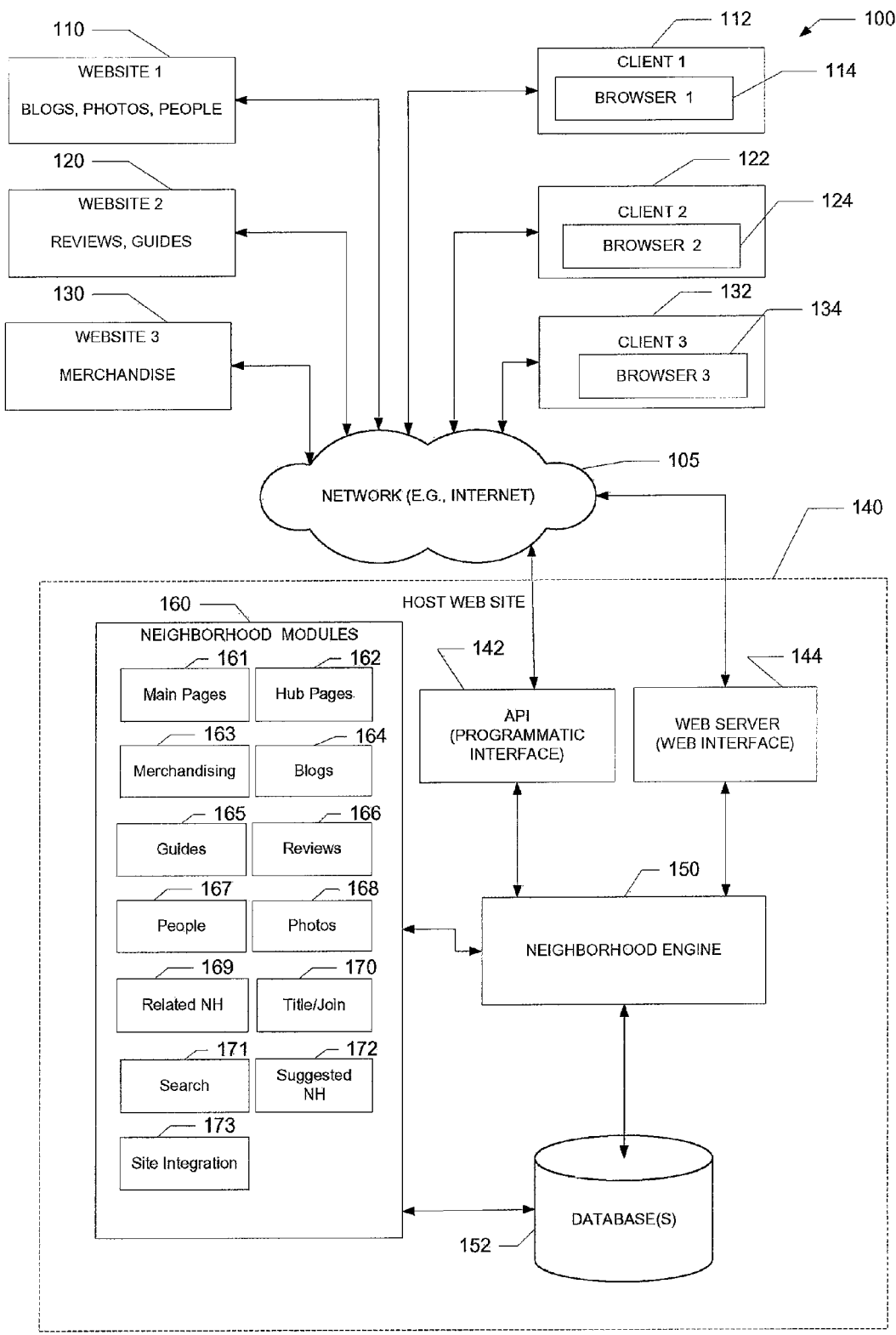
FIG. 1 illustrates an example embodiment of a networked system in which various embodiments may operate

A computer-implemented system and method for creating topic neighborhoods and a visualization for related topic neighborhoods in a networked system are disclosed. In the following description, numerous specific details are set forth. However, it is understood that embodiments may be practiced without these specific details. In other instances, well-known processes, structures and techniques have not been shown in detail in order not to obscure the clarity of this description.

As described further below, according to various example embodiments of the disclosed subject matter described and claimed herein, there is provided a computer-implemented system and method for creating topic neighborhoods and a visualization for related topic neighborhoods in a networked system. Various embodiments are described below in connection with the figures provided herein.

—Overview of Various Embodiments

Neighborhoods are ideal micro-communities: groups of people centered around a shared passion for particular products, activities, or topics. They're vibrant and interesting because the people who join them want to share new things with each other. In addition to discussion boards, neighborhoods can show a snapshot view of related products. For example, the Harrison Ford neighborhood might show listings for Star Wars or Indiana Jones. These neighborhoods also pull in related reviews, guides, and blog posts. Neighborhood members and non-members can vote on photos submitted by other members. The voting feature is configurable. Neighborhood members can also rate, classify, and tag discussion board posts.

Neighborhoods represent an ensemble of topics around which members can gather. Topic neighborhoods can be created either by a host site or by a community member. The content accessible via Neighborhoods can relate to a topic (e.g. a particular user as with My World, or a specific topic such as coffee or race cars). The host site helps make the content relevant to the individual viewers/Neighborhood members. For example, the Coffee Neighborhood may have a module for local coffee shops in the area based on postal zip code. The host site provides the matching of relevant backend data, so that a viewer in the zip code 95125 can see, for example, information related to the Starbuck's Coffee Shop(s) located in that zip code. Likewise, an expert in the Coffee Neighborhood may recommend a La Pavoni espresso machine in response to a query, and listings for such machines can appear in a module. Neighborhoods functionality, of various embodiments described herein, provides content that consists of transactional content as well as content typically found outside of the host site.

In a particular example embodiment, the Neighborhoods functionality is implemented in a set of processing modules. In the example embodiment, these modules include: Main Pages, Hub Pages, Merchandising, Blogs, Guides, Reviews, People, Photos, Related Neighborhoods, Title, Join Neighborhood, Search, Suggested Neighborhoods, Site Integration, and My Host Site Integration. Each of these modules are described in the sections of this document below.

Referring to FIG. 1, an example networked system 100 in which various embodiments may operate is illustrated. As shown, various users of client systems 112, 122, and 132 using browsers 114, 124, and 134 can communicate with and interact with various websites 110, 120, and 130 via a network 105, such as the Internet. Using well known protocols (e.g. HTTP) and user interfaces, users can consume and create content on various websites 110, 120, and 130 and perform commercial transactions (e.g. purchase/lease products and services, bid on products/services, etc.) on various websites, such as website 130. The content created and/or maintained by users or websites can be in a variety of forms. Blogs are commonly created and consumed forms of such content. Photo collections, document collections, music collections, product/service reviews, product/service guides, information sources related to people, places, objects and the like are also created and maintained on the websites 110, 120, 130, or client systems 112, 122, and 132. Unfortunately, these information sources are typically independent, disparate, and unconnected. Particular embodiments described herein seek to gather information content in various forms that relate to a given topic and form a neighborhood wherein users interested in the given topic may communicate with other interested users and share related content in an efficient and easy manner.

Figure 2:
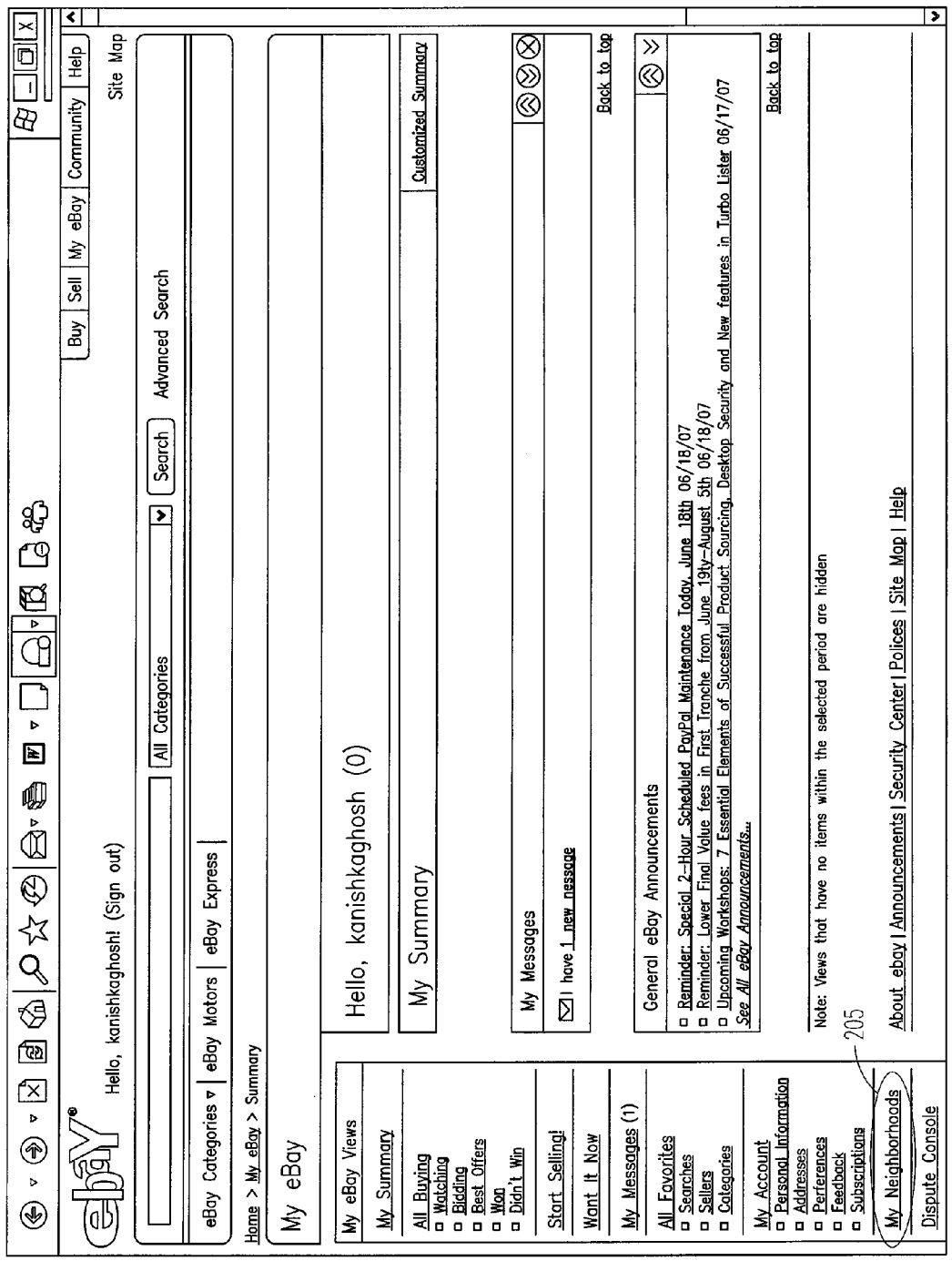
FIG. 2 illustrates an example of a link provided on a web page of the host website to activate neighborhood functionality.
Figure 3:
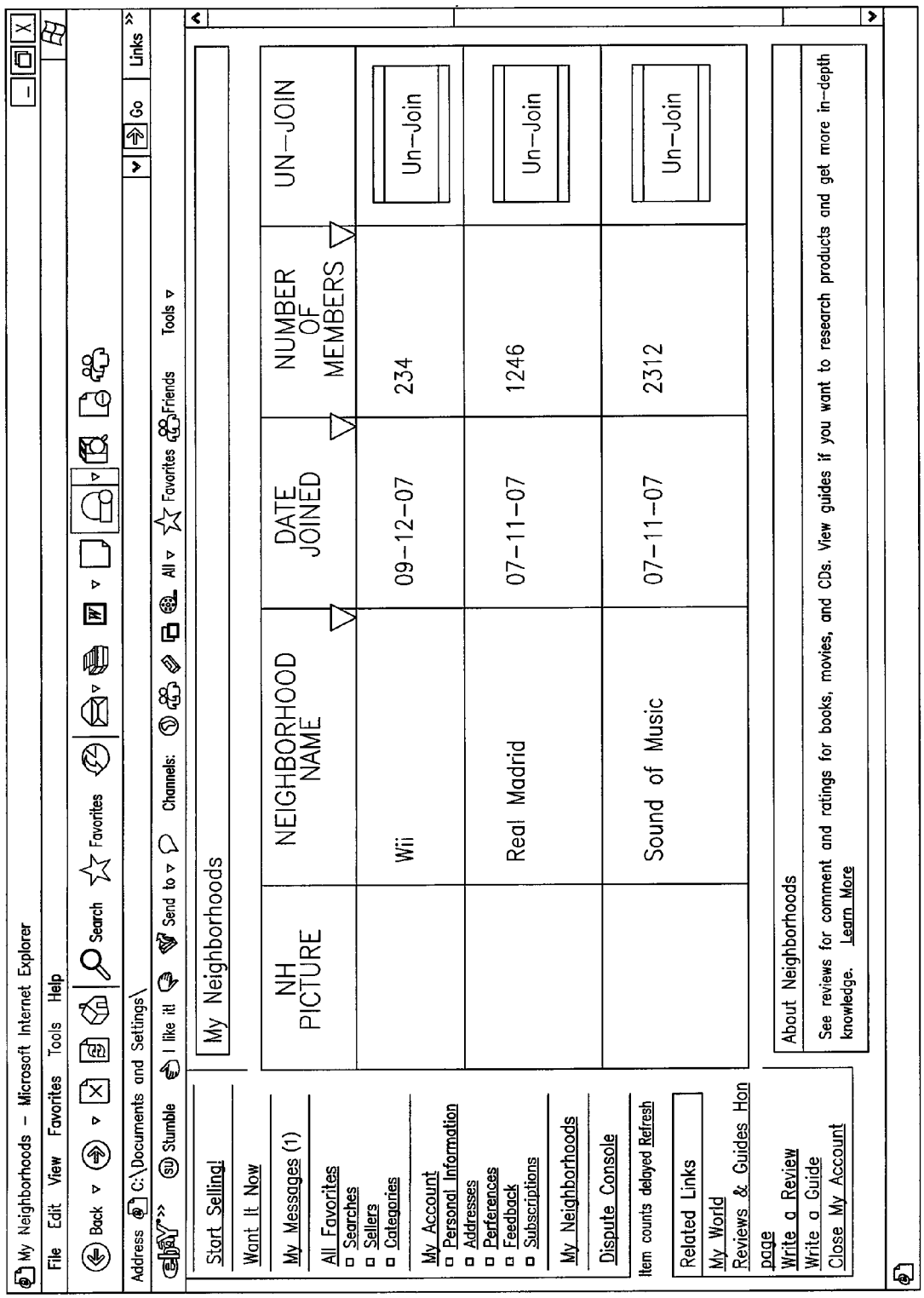
FIG. 3 illustrates an example screenshot of a neighborhood page showing a set of available neighborhoods with associated neighborhood image and related neighborhood information.
Figure 4:
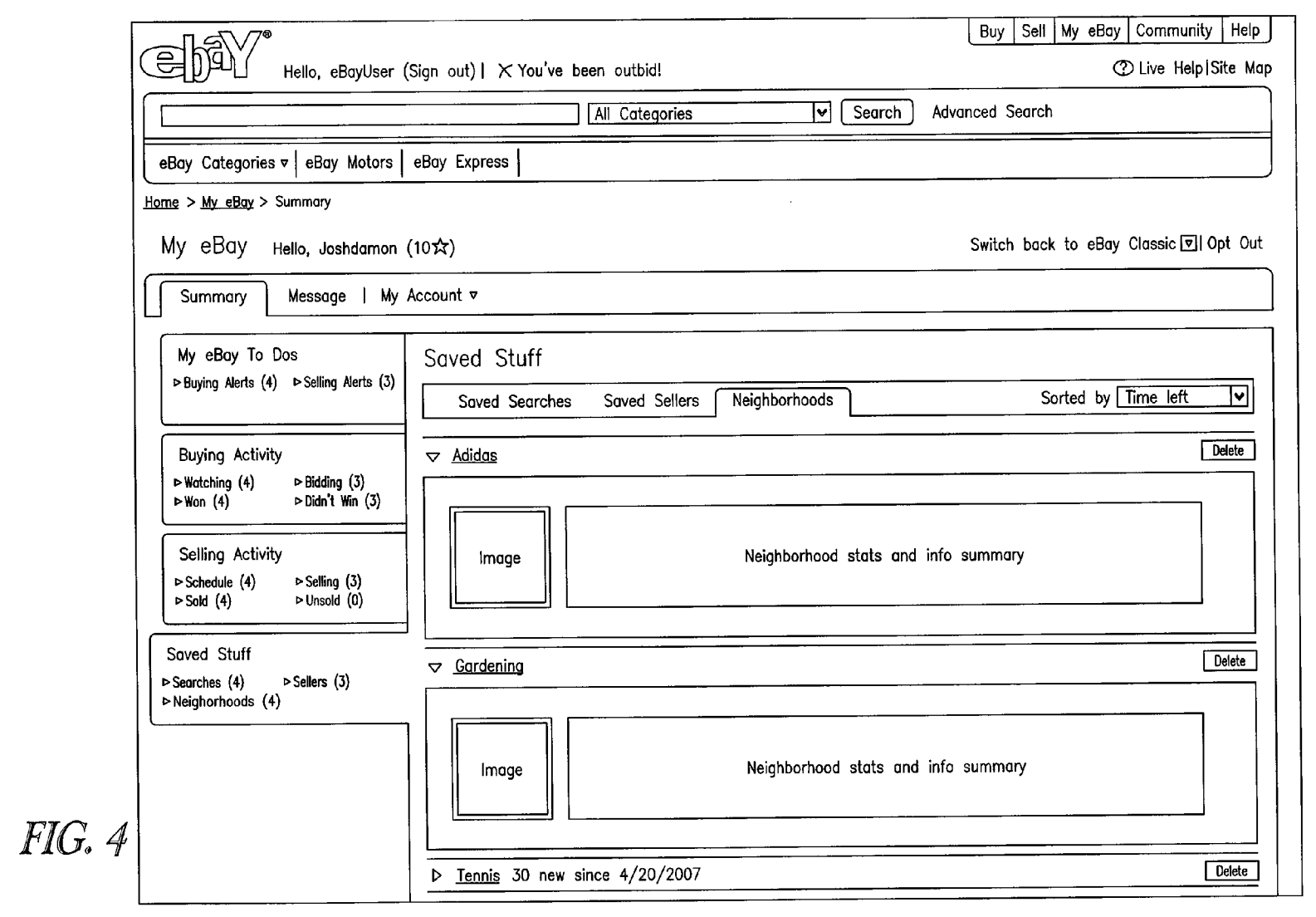

Referring still to FIG. 1, a host website 140 may host the neighborhood functionality of various embodiments. A neighborhood engine or neighborhood generator 150 provides a control mechanism to receive user requests via web server interface 144 or application programming interface (API) 142. As described in more detail below, such requests may be received in the form of a link provided on a web page of the host website 140. Activation of the link by a user of client systems 112, 122, and 132 causes activation of the neighborhood engine 150 by the host website 140. Such a link is shown as link 205 shown in FIG. 2. FIG. 3 illustrates an example screenshot of a neighborhood page showing a set of available neighborhoods with associated neighborhood image and related neighborhood information. FIG. 4 illustrates an example screenshot of a neighborhood page showing a set of available neighborhoods with associated neighborhood information accessed via a tab on a page provided access to a user's saved information. These example screenshots illustrate two different sample pages that display a set of available neighborhoods of which a user is a part.

Depending upon the particular request issued by the user to the neighborhood engine 150, the neighborhood engine 150 can employ one of the neighborhood modules 160 to service the request. For example, a user activation of a neighborhood link may cause the display of a set of main pages (described in more detail below) as provided by main pages module 161. Similarly, a user activation of a neighborhood link may cause the display of a set of hub pages (described in more detail below) as provided by hub pages module 162. Each of the other neighborhood modules 160 may also service particular neighborhood requests made by a user. As described in more detail below, merchandising module 163 provides merchandising content associated with a particular topic corresponding to a selected neighborhood. As explained above, each neighborhood is associated with a particular topic. The topic can be defined when the neighborhood is created. Any merchandising information associated with a particular topic corresponding to a selected neighborhood is aggregated by merchandising module 163 and served upon request from a user. For example, a particular neighborhood may be created for the topic of race cars. Merchandising module 163 may then aggregate and serve merchandising information related to race cars (e.g. listings of race cars for sale or rent, information related to race car vendors, information related to race car parts or service, information related to race car venues, information/tickets related to racing events, advertising related to race cars, and the like). Similarly, each of the other neighborhood modules 160 can aggregate and serve various forms of neighborhood information. For example, blogs module 164 can aggregate and serve neighborhood information related to blogs associated with the neighborhood topic. Guides module 165 can aggregate and serve neighborhood information related to guides associated with the neighborhood topic. Reviews module 165 can aggregate and serve neighborhood information related to product/service reviews associated with the neighborhood topic. People module 167 can aggregate and serve neighborhood information related to people associated with or interested in the neighborhood topic. Photos module 168 can aggregate and serve neighborhood information and pictures/images/videos associated with the neighborhood topic. Related neighborhood module 169 can aggregate and serve neighborhood information from other neighborhoods that may be related to the given neighborhood topic. The title/join module 170 provides the neighborhood functionality for displaying the neighborhood title and for joining a neighborhood. The search module 171 provides the functionality to search neighborhood data as stored in database 152. The suggested neighborhood module 172 provides the functionality to suggest one or more neighborhoods to a user based on user selections, behavior, searching, and the like. Site integration module 173 provides a set of functionality for integrating neighborhoods into the host site 140 and related sites.

—Neighborhoods Main Pages Module

This section describes the functionality of an example embodiment of the Neighborhood Main Page for each Neighborhood as provided by main pages module 161. Neighborhoods are typically site specific except where otherwise noted. Each neighborhood can have its own main page for the site with which the neighborhood is associated. Neighborhoods can be on all host sites. On all sites that share neighborhoods, when viewing the shared neighborhoods, the page should display with the viewing site's headers, footers, and links. This is standard for mini-sites. The URL for a neighborhood page can be:

neighborhoods.host_site.com/<name>

The domain can change depending on the associated host site. The Neighborhood name in the URL can be the Neighborhood name stored in the database but can have spaces replaced with "-". Neighborhood names with non-ASCII characters should have the closest ASCII character used as a replacement (similar to URLs for host site Stores). Breadcrumbs for the page can be Home (linked to the host site home page)—Community (linked to the Community hub page for the site)—Neighborhoods (linked to the site specified version of neighborhoods.host_site.com)—<Name> (no link). The page title can be host site Neighborhoods—<Name>. Meta tags for description can be "host site Neighborhoods provide host site members with an area to discuss topics and products of shared interest." Meta tags for keywords can be "neighborhoods, host site, host site Neighborhoods, neighborhood, host site Neighborhood, <Name>, <keywords from db>". Site catalyst variables are:

var pageName="Neighborhoods_Page",
var pageID="Neighborhoods".

Each neighborhood can display a variety of neighborhood modules. The layout and which modules can appear and where are detailed by the layout and configuration files associated with the neighborhood. Modules may be hidden if there is not sufficient content for them to display. The modules that display and their layouts can change in response to the neighborhood type.

Neighborhoods are associated with a type. Types include, for example: activity/hobby, collectible/thing, brand, product family, location, auto model, auto make, book, movie, television show, musical artist, author, actor/director, sports team, person. A page counter similar to those used for View Item should track the page views for each neighborhood's main page (simple GUID tracking to prevent extra counts). Ideally, this counter would be capable of tracking the count for the last seven days (sliding total). If a user enters a URL in the neighborhoods domain that does not resolve to a neighborhood (for example:

http://neighborhoods.host_site.com/doesntexist)

or no data is returned, then an error message can be displayed.

In a particular embodiment, users can, 1) explicitly create a new neighborhood, or 2) neighborhoods can be dynamically created on the fly as a user searches on that topic or product and decides to visit the associated neighborhood. In regard to explicit user-created neighborhoods, users can create a neighborhood by explicitly providing a topic to which the neighborhood will relate. Once the user provides the topic, the various neighborhood functions described herein can begin to collect, collate, and present information related to the user-provided topic from various network sources (e.g. merchandise sites, blog sites, review sites, guide sites, etc.). The collection of the neighborhood information can be performed by using the user-provided topic as a search term. Additionally, users can explicitly provide other sources of neighborhood information that the system of various embodiments can retain and automatically access for the collection of additional neighborhood-related (i.e. topic-related) information. Once the collection of neighborhood information is assembled, users can be invited to join the new neighborhood and invited to suggest additional neighborhood content and content sources for the neighborhood.

A host site can collect user-provided neighborhood suggestions in the form of topic suggestions from the user community. The user community can be offered an opportunity to vote on a favored neighborhood or the most popular neighborhood suggestions. In a particular embodiment, only the most popular neighborhood suggestions will be used to create a new neighborhood. In other embodiments, any topic provided by a user can be used to create a new neighborhood. Later, unpopular neighborhoods or seldomly used or seldomly visited neighborhoods can be pruned away by deleting these under-performing neighborhoods from neighborhood selection lists and content update processes.

In a particular embodiment, neighborhoods can be dynamically created on the fly based on individual or collective user behavior, interests, demographics, and the like. For example, as a user searches on particular topics or products, patterns of user behavior and interests can be detected automatically by system processes. User search strings, viewed web content/sites, product listings, purchased products, items on which a user placed a bid, and the like can be retained and used to detect correlations in the user behavior and interests. Further, demographic and geographic information can further be used to provide additional dimensions on the data sets from which correlations can be detected between particular users or collections of users and the topics to which the users are most closely related. These correlated topics can be used to implicitly create neighborhoods for the particular users or collections of users to which they relate. Once these topics are detected and neighborhoods are implicitly created, the various neighborhood functions described herein can begin to collect, collate, and present information related to the dynamically-detected topic from various network sources (e.g. merchandise sites, blog sites, review sites, guide sites, etc.). The collection of the neighborhood information can be performed by using the dynamically-detected topic(s) as a search term. Once the collection of neighborhood information is assembled, users can be invited to join the new neighborhood and invited to suggest additional neighborhood content and content sources for the neighborhood. Users can then explicitly provide other sources of neighborhood information that the system of various embodiments can retain and automatically access for the collection of additional neighborhood-related (i.e. topic-related) information.

A data model for a particular neighborhood embodiment is provided below as guide for what may be developed for a particular host site:

Neighborhood id
Site id
Neighborhood name
Keywords—used for search for a neighborhood
Default image URL
Type (see above)
Page/Module layout
Creation date
Modified date
My world query keyword
Reviews query parameters—keywords, AND/OR, display order (most popular first, least popular first, highest rated first, lowest rated first, most reviews first, least reviews first)
Guides query parameters—keywords, title only/description and tags, include host site guides, display order (most helpful first, least helpful first, most recent first, oldest first), AND/OR
Blogs query parameters—keywords, posts/titles/members search, display order (options), AND/OR
Listings query parameters—keywords, title/descriptive, ALL/ANY/Exact match/Exact phrase, excludes words, display order (newly listed, ending soonest, price lowest first, price highest first, best match, category), site id, category id, gallery, low price, high price, preferred location (site, country, continent, worldwide), located in <country>, available to <country> and supporting the advanced search keyword commands
Listings query parameters 2 (second set)—same as above
Top Searches keywords—keywords
Related Searches keywords—keywords
Status (active/deleted)
Number of members
Page views —Neighborhoods Hub Page Module This section describes the functionality of an example embodiment of the Neighborhoods Hub Page based on the portal infrastructure and its associated modules.

The URL for the hub page can be the site specific equivalent of http://neighborhoods.host_site.com. Page title can be "host site Neighborhoods". Meta tags for description can be "host site Neighborhoods provide host site members with an area to discuss topics and products of shared interest." Meta tags for keywords can be "neighborhoods, host site, host site Neighborhoods, neighborhood, host site Neighborhood". Site catalyst variables are: var pageName="Neighborhoods_Hub_Page", var pageID="NeighborhoodsHub". Breadcrumbs for the page can be Home (linked to site specific version of http://www.host_site.com)>Community (linked to site specific version of http://hub.host_site.com/community)>Neighborhoods (no link).

The hub page can have a search input text box that allows for the user to enter a query string up to 128 characters in length. A Search button submits the query to the "search for a neighborhood" back end and navigates the user to the Neighborhood Search Results page. The query box can show auto-completed entries as the user types that match existing neighborhoods (or keywords) for the site. This can be done in JavaScript (JS) using a JS file that contains all of the terms to match. The other way to do it is with a simple AJAX call to a new command that would have the list of terms cached and returns the matches.

The hub page can have a Browse related neighborhoods module—title "Related Neighborhoods". This can be the same Flash module as on the Neighborhood pages themselves. See the Related Neighborhoods section below for additional details. If the user is signed in and has joined a neighborhood, the module can start with displaying the neighborhoods related to the neighborhood most recently joined by the user. Otherwise, the module should start with the largest (most members) neighborhood (or possibly the most recently active). If possible, the module should have a "randomize" button that is configurable to show or hide. For use on the Neighborhoods Hub Page, the "randomize" button can be configured to display. This button can call a new back-end command that selects a new random neighborhood from the valid list of neighborhoods for the site and then return it along with its related neighborhood data. Another alternative can be to have the module display several random neighborhoods (not connected) at the start and when the user clicks on one the related neighborhoods for it appear.

There can be a Suggest a Neighborhood link that can pop up the Suggest a Neighborhood form as in the Neighborhoods Join section. This module is described in the Neighborhoods Join section below.

The title can be "Neighborhoods Recently Joined". There can be a grid of 16 (2 rows of 8) default pictures of Neighborhoods. The number of pictures and the number of rows can be configurable in the front-end Flash (or for the module if done in DHTML). Each image can be 96 pixels wide×72 pixels tall. The pictures shown can be the default Neighborhood pictures of the distinct, most recently Neighborhoods by any user on the current site. Pictures can be ordered by most recently joined first. The pictures can link to the actual neighborhoods pages for each neighborhood. Rollover effects on the pictures can show the name of the neighborhood. If not enough distinct neighborhoods have been joined to fill the display, then placeholder images (aka blanks) can be used instead. If there is an error retrieving data, a message stating, "We couldn't find any recently joined neighborhoods." should display.

This module may have a front-end written in Flash (or DHTML) and may be able to re-use the Flash movie written for the People module but with a query to a different back-end and configured to not shown pagination. The back-end query for the module can be against the table that stores the users who have joined a neighborhood. It would return users who most recently joined any neighborhood for the site but qualifies the results by requiring the neighborhoods to be distinct. Data can be returned in XML format.

There can be a display of several of the most recent users to join any neighborhood for the site—title "Recently Joined People". The number of users to display can be configurable and be set to 3 for the Neighborhoods Hub Page. The front-end does not need to be in Flash and would not be a grid of pictures as in other People modules. The back-end query searches for the configured number of users who have most recently joined any valid neighborhood for the site. For each user, we can display their My World photo or icon, userid, feedback score, feedback star, and the name of the neighborhood they joined. The picture and userid can link to the user's My World page. The feedback score can link to the user's View Feedback page. The neighborhood name can link to the neighborhood page for that neighborhood. The data can be ordered to display the user who most recently joined first.

In a particular embodiment, the host site 140 can configure a My Neighborhoods module. The module title can be "My Neighborhoods". The My Neighborhoods module can display the names of neighborhoods a user has most recently joined for the current site. Up to 5 neighborhoods can be displayed and they can be ordered by most recently joined first. Each neighborhood name can link to the associated neighborhood page. The user must be signed in and joined for the list to display. If the user has not yet joined any neighborhoods or is not signed in, an educational message should display instead. The educational message can display in the area normally occupied by the list of neighborhoods and can inform about what neighborhoods are. If the list of neighborhoods could not be retrieved, the message "We had a problem fetching your neighborhoods." can be displayed. A link to the user's My Neighborhoods page (in My host site) can be displayed. The module can also display a list of up to 5 names of recommended neighborhoods along with their membership counts. Each name can link to the associated neighborhood page. The recommended neighborhoods are the top scoring related neighborhoods for the neighborhoods most recently joined by the user. If the user already belongs to any of the recommended neighborhoods, it should not be displayed. If the user is not signed in or has not joined any neighborhoods, then the recommended neighborhoods can be based on search terms stored in their cookie (if this is possible) or display the neighborhoods with largest number of members for the current site. If there is a failure to retrieve the recommended neighborhoods or the user already belongs to all of the recommended neighborhoods, then the recommended neighborhood section should not display.

In a particular embodiment, there can be a statistics module to display information about neighborhoods. This module can be implemented in Flash (or DHTML but Flash is preferred). Tabs or buttons may be used to change views of the data displayed such as time period or which set of data to display. The names of the neighborhoods with the most members for the current site and their counts can be displayed. The names of the neighborhoods with the most discussion board posts for the current site and their counts can be displayed (assuming the discussion board solution allows for this). The names of the neighborhoods with the most page views for the current site can be displayed. The number of neighborhoods to return for each data set can be configurable and set to 5 for the Neighborhoods Hub page. The neighborhood engine 150 can generate this information not only for all-time but also for a given time period. For instance, most members added in the past 7 days or most posts in the past 7 days. Queries for the data might include a "where date>now( )-7" or similar clause. In the case of multiple neighborhoods that have the same values, then the most recently created neighborhoods can be returned. The number of days to go back and number of results to return can be specified as an input to the command along with the site id. The command can also pass which data set is desired as an input parameter (# members, # posts, # page views). If implemented using Flash, the data can be returned in XML format. The neighborhood names link to the associated neighborhood pages. If there is a failure to retrieve the statistics, the message "We're crunching the numbers, stats can be back shortly." can be displayed.

A Popular Neighborhoods module can also be provided in a particular embodiment. The Popular Neighborhoods module can be used to display a tag cloud showing the names of neighborhoods for the current site that have the most members (all-time). The number of neighborhoods to return can be configurable and the value can be 50 for the Neighborhoods Hub page. Up to the configured number of neighborhoods can be displayed with font sizes/styles differing depending on their relative sizes. Each name can link to the associated neighborhood page. The results can be displayed in a random order within the cloud. If neighborhoods have the same number of members, then the neighborhoods that were most recently created can be returned. An alternative might be to have the tag cloud be the most popular keywords associated with neighborhoods. In this case, clicking the links would take the user to the Neighborhoods search results page for the term.

A Help pages module can also be provided in a particular embodiment. New content can be added to the Community section of Help to describe what neighborhoods are and how to use them. Specific Help sections can be written about the Related Neighborhoods module and Search for a Neighborhood module along with Suggest a Neighborhood.

—Merchandising Module

The Merchandising Module displays listings for a Neighborhood based on a merchandise listings query and parameters associated with a Neighborhood. The module can be implemented in Flash and can perform listings queries using the host site API. The merchandising module displays listings in a manner similar to the product/service listings provided on many sites. The merchandising module 163 can query the search results API for listings matching the query specified for the neighborhood. The query and parameters are passed as input variables. Each listing associated with the neighborhood merchandising may include an image, animation, or video clip. See the section above for Neighborhood Main Pages for more details.

Neighborhood merchandise listing results can be displayed in a paginated grid of 50×50 pixel images corresponding to the gallery images for each listing. The layout of the grid of images (number of rows and number of images per row) can be configurable and passed as input variables. The default can be 2 rows of 10 images. The total number of results found can be displayed. A loading animation can play when the module is initialized and an animation can pop each item into place in the grid. Mousing over an image can enlarge the image (and mouse off can return the image to its regular size) with an animation effect. The mouse over can also cause the listing title, price and currency, and time remaining to display. The total number of pages of results can be displayed. Previous and Next arrows can be used to navigate forward and backward through the number of result pages. The user must click the displayed result page to have the module reload with the results of the selected page. Forward and back buttons can become active as appropriate to take the user back to pages they have previously visited. Clicking an image can put the module into a mode where it displays additional information about the single listing. This information display can occupy the full size of the module. Information displayed includes the title, time remaining, current bid, number of bids, number of views. A larger version of the image is displayed with panning enabled to see the full image. Clicking the image itself can cause the image to fill the module. A toolbar can appear with a close button to return to the detailed listing display. If multiple images exist for the listing, they can be displayed in a slide show and the toolbar can contain forward and back arrows, a pause button, and a gallery button. The gallery button can display small thumbnails of all of the images for the listing with the currently displayed image highlighted. Clicking an image in gallery mode can cause that image to be displayed in the widget and can exit gallery mode. Mousing over the time remaining can change the time remaining to display the end time instead. Mousing over the current bid can display the BIN price (if it exists), and shipping price instead of the current bid. A seller button can display the seller userid, feedback score and star when moused over. Clicking this can take the user to a My World page for the seller. A high bidder button can display the high bidder userid, feedback score, and star. Clicking this can take the user to the high bidder's My World page. A refresh button can refresh the data for the item. A view & bid button can take the user to the View Item page for the listing. A Watch button can add the listing to the user's watched item list if they are signed in, else it can send the user through the sign in flow and then add the watched item if sign in completes successfully and then return the user to the page.

The module can access the search results and item data by making API calls. A search box allowing for 50 characters of input and a search button can allow a user to input their own search terms and override the values configured in the input variables. The display of the search box and button can be configurable as input variables. Other embodiments may auto refresh to display more listings or offer alternative views such as auto switching to a display of 3 listings ending soon, popular products associated with a neighborhood, or most watched items. The module can be re-used on other web pages that are not hosted by the host site as a stand-alone application. The module should store default English text for this case. If no results can be found, the message "We couldn't find any listings." can be displayed. If there is an error returning the results, the message "We had a problem fetching the listings." can be displayed.

—Blogs Module

This module can display the related blog posts for a Neighborhood. The module can be displayed in different layouts and so can be able to resize accordingly. The posts can be returned from a query in the Blog search on pre-defined keywords and parameters stored in the data model for each neighborhood and ordered by the attributes defined for the particular NH (Refer to Blog Query Section). The module can have a heading—Title: 'Blogs'. The total number of related posts (count) can be displayed—"XXX related posts". If the query result is 0, then this section cannot be displayed. The number of related posts can be a Hyperlink. The related posts can be displayed in a fashion similar to the blogs post search results page.

For each post, the displayed information in a particular embodiment is as follows.
  Post Title—This is a hyperlink to the actual post itself. Ex) http://blogs.host site.com/cards_nstuff/entry/Hi-phew-Taking-a-break/_W0QQidZ254233017
  Userid of the blogger—This is a hyperlink to the blogger's My World page.
  The blogger's feedback score. This is a hyperlink to the blogger's View Feedback page.
  The blogger's feedback star.
  Post Date—Date and time in standard local format.
  Additional information returned from the blogs search back end that is not currently displayed for each post also includes the My World image for the blogger, the title and URL for the blog itself, and the number of comments.

The default number of posts to be displayed in the module is 3. This number can be configurable. The links below appear only if there are matching blog post results returned.
  More—Link to display all the matching blog posts in blog posts search results. This can link to the blog search results page for the actual query executed by the module. NOTE: This query may include OR logic and other Boolean operators that are not normally available from the blogs search web form. This link can be absent if there are no related blogs/no more related blogs to display.
  Start Blogging—This is a link to the Blog Start page— http://blogs.host_site.com/ws/host siteISAPI.dll-?BlogStart If the blog query search returns 0 results, then a message "We couldn't find any matching blog posts. Be the first to blog." can be displayed in the area where the blog posts would normally appear. This can be a link to the Blog Start page— http://blogs.host_site.com/ws/host siteISAPI.dll?BlogStart. If there is an error in retrieving the blogs, display the message "Sorry, the related blogs could not be displayed now" instead of actually displaying results.

Each Neighborhood can store a list of keywords and parameters for a Blogs Query Search. There can also be associated Attributes. The attributes can include the following.
  Results Display Order
  What to Search Options—Posts, Titles, Members
  The blog query keywords for a particular Neighborhood can be used to retrieve the results for the blogs module. The query search can be a logical OR search for posts using all the keywords associated for the blogs module for a particular Neighborhood.
  The query keywords and attributes can be configurable via the neighborhoods data model.

—Guides Module

This module displays related guides for a Neighborhood. The module can be displayed in different layouts and so can be able to resize accordingly. The heading for the module can be displayed as Heading title 'Guides'. This heading can be captured from the configurable database. The total number of related guides (count) can be displayed. If there are no related guides then this section can not be displayed. The count can be a hyperlink to the guides query result page.

The body of the guides section can display—(for each guide) the following information.
  The guide name—Clicking on the name can take the user to the particular guide page.
  The userid of the guide author. Clicking on the userid can take the user to the My World Page of the guide author.
  The Feedback score for the guide author. Clicking on the Feedback Score can take the user to the View Feedback page for the guide author.
  The feedback star for the guide author.
  Reviewer rating (if available). Clicking on the reviewer rating can take the user to the list of guides published by guide author.
  Links. A link can take the user to the guides query results page displaying the search results for a logical OR query using the keywords for the guide section for the particular Neighborhood. (www.pages.host_site.com/help/find/search_commands.html). This link cannot be displayed if there are no results for the related guide query search or no related guides beyond the items already displayed. Post a Guide—This link can take the user to the 'Write a Guide' page.
  The default number of guides to be displayed is 3. This number can be configurable.
  The guide section can be populated by the results as described in the guide query details section.
  If there are no related guides—the section should display 'We couldn't find any Related Guides'.
  If there is an error in retrieving the guides, then a message "Sorry we couldn't display any Guides currently" can be displayed.

Each neighborhood can define keywords used to query for related guides. The number of keywords is not constant and can be configured. Each neighborhood can define attributes specifying the order of displaying the query results and other parameters related to the query. The search can be conducted on all the guide keywords defined for a neighborhood (logical OR) as defined in www.pages.host_site.com/help/find/search_commands.html.

—Reviews Module

This module displays reviews based on the review query associated with a neighborhood. The module can be displayed in different layouts and so can be able to resize accordingly. The heading of the section can be displayed as Heading title 'Reviews'. This heading can be captured from the configurable database. The total number (count) of related reviews can be displayed. If there are no related reviews then this section can not display. The count can be a hyperlink to the reviews query results page. The body of the reviews section can display in a particular embodiment (for each review) the following information.

- The review name—Clicking on the review link can take the user to the review page for the particular review.
- The Average Ratings Bar (with the numeric rating score, score out of 5) and the 'from xxx reviews' string, xxx represents the number of reviews for the particular review.
- Links-More—This link can take the user to the review query results page displaying the search results for the reviews query associated with the neighborhood. (www.pages.host_site.com/help/find/search_commands.html). The More link cannot be displayed if there are not results for the related reviews query search or no related reviews beyond the list already displayed. Write a Review—This link can take the user to the 'Write a Review Page'.
- The default number of reviews to be displayed is 3. This number can be configurable.
- The review section can be populated by the results as described in the review query details section.
- If there are no related reviews—the section should display 'We couldn't find any Related Reviews'.
- If there is an error in retrieving the reviews, then a message "Sorry we couldn't display any Reviews currently." can be displayed.

Each neighborhood can specify keywords for a query to find related reviews. The number of keywords is not constant and can be configured. Each neighborhood can specify the order of displaying the query results and other query parameters. The reviews search can be conducted on all the reviews keywords for the neighborhood (logical OR) as defined in:
   www.pages.host_site.com/help/find/search_commands.html.

—People Module

The People Module displays information about members who have joined the neighborhood. The front end of the People Module can be built using Flash and its size can be configurable (and based on the number of images, their size, and the grid height and width). The front end can communicate with a back end command or API. The back end can send XML data in response to commands issued from the front end. All localizable strings can be passed as input variables. In a particular embodiment, the People Module displays by default a 4 wide×4 tall grid of My World images or icons from members who have joined the neighborhood. The number of images high and wide can be configured using input variables and can determine the exact number of images that may be displayed at any time. If the query for joined members is not null, the images displayed can be the My World images or icons of up to the last 16 (configurable) people to join the neighborhood with the newest member appearing in the upper left corner. Members can be displayed newest joined to oldest. If less than the configured number but more than zero results are returned, the remaining spaces in the grid can display a placeholder image. If the query for joined members returns with zero results meaning no members have joined the neighborhood, then the module should display "No members have joined yet—be the first" instead of a count of the members joined. It can then query for up to the configured display number of users whose My World bio tags (any category) match the My World tag query keywords for the neighborhood. Only data for users who have uploaded their own My World image would be returned. Data can be ordered by last update date of the My World profile. Each image displayed can be resized and cropped to 50×50 pixels in the Flash movie. The crop height and width can be configurable as input variables. Each image can be linked to a URL specified in the <ImageLink> or equivalent tag in the XML node for each image. In this instance, the back end can populate the tag with the URL for the corresponding user's My World page for the current site. A count of all of the members who have joined the neighborhood can be displayed unless there are no members in the neighborhood. A loading animation can be used to pop the images into place and another can play whenever the module is loading new data. Mousing over an image can display a pop up showing a larger version of the image (up to 75×75 pixels configurable via input variables) along with the user's userid, feedback score, and star. Users who have not uploaded their own image into My World can be shown with their My World icon (for display of actual neighborhood members). Previous and Next arrows can display if more than a single page of members has joined the neighborhood. Clicking the Next arrow can reload the module with the group of next oldest members. Clicking the Previous arrow can reload the module with the previous group of newer joined members. No Previous arrow should display on the first page (newest members). No Next arrow should display on the last page (oldest members). The neighborhood members data feed can take as inputs the neighborhood id, site id, and the page number to display. The My World tag data feed can take as inputs the site id and the search keyword. The neighborhood members data feed for the module can consist of the current page number, total number of pages, number of images per page, total number of members, neighborhood id, and the following information for each image: userid, feedback score, feedback star, my world image or icon url, date joined the neighborhood, and a link to be associated with the image—in this case, the URL for the user's My World page. The My World tag data feed for the module can consist of the current page number, total number of pages, number of images per page, total number of matching My World users, and the following information for each image: userid, feedback score, feedback star, my world image Uniform Resource Locator (URL), date of My World profile update, and a link to be associated with the image—in this case, the URL for the user's My World page. The module can be configurable to hide the count header and only show the images and pagination. The module can be configurable to only query for My World users based on a specified tag. The tag can be used to display matching My World users instead of neighborhood members. The module can be configurable to display a search box (50 characters input) and search button that when submitted can query for users who's My World tags from any category match the query (as long as the user has uploaded their own My World image). The module can be configurable to open the image links from the data feeds in a new browser window. If the user does not have Flash installed, a static image can be displayed along with a message directing the user to install Flash.

—Photos Module

The Photos Module in a particular embodiment, is a Flash module that interacts with the back end to display photos from a Neighborhood's photo gallery. The Photos Module can display photos from the current neighborhood's photo area. The photos module can be built in Flash and can have a fixed size of 400 pixels wide×300 pixels tall. If the user does not have the minimum version of Flash installed, the photo module can display the default image of the neighborhood as plain HTML with text "please upgrade to the latest version of Flash". A default photo is specified when each neighborhood is created. The default photo can be stored on the host site Pics servers in several sizes (400×300, 96×72, 48×36) and can use a naming convention to identify which size. For example, image400×300.jpg or image48×36.jpg. The photos module works off a photos data feed accessed via a URL. The data feed consists of information such as photo URL, userid of the submitter, date and time of submission, positive votes, negative votes, rank, photo id. The module takes input parameters specifying the site id, neighborhood id, and if the user is signed in, the userid along with if the user is a member of the neighborhood. These inputs are used when making the call to the photos data feed. In a particular embodiment, the photos module operates in several different modes:

a. Single photo slide show
b. Single photo browse
c. Upload mode
d. Gallery slide show
e. Gallery browse
f. My photos single
g. My photos gallery A larger (or fullscreen) version of each mode is also available. This larger version expands the area of the screen occupied by the Photo Module, but shows the same data just in a larger size. An expand icon would switch the module to full screen mode. Pressing ESC would return the module to its normal size. Module starts off showing a single image, the default image, in single photo slideshow mode. Photos that are in portrait orientation can appear with black padding so that a 4:3 ratio of width to height is maintained.

The photos module data feed is returned in response to queries posted to a URL. Data is returned in XML format. In a particular embodiment, the data returned is shown below.

```
<neighborhoodid>1</neighborhoodid>
<numphotos>21</numphotos>
1
<photo>
    <url>http://imageurl.com</url>
    <userid>someuserid</userid>
    <submissiontime>timestamp</submissiontime>
    <positivevotes>4</positivevotes>
    <negativevotes>1</negativevotes>
    <rank>2</rank>
    <photoid>12345465</photoid>
    <default>no</default>
</photo>
```

Queries to the data feed include queries for all photos for a neighborhood by passing in the neighborhood id and optional page number or optional photoid or optional userid along with optional number of photos to return per page. This can return all of the photos for the neighborhood in a paginated format. Specifying the page number in the call can return results beginning with that page number. Specifying the photoid would return the paginated list of photos in rank order starting with the photo matching the id specified. Specifying the userid can return a paginated list of all photos in that neighborhoods submitted by the specified userid.

The photos module can call a voting URL to record the positive or negative votes for an image. The voting URL would take as inputs the photoid, the vote (pos, neg), and the userid of the user submitting the vote.

The photos module can call a delete URL to delete an image. The delete URL would take as inputs the photoid and the userid of the user requesting the deletion.

In a particular embodiment, a slideshow of images can be shown. Every 3 seconds the photo changes to the next photo in the neighborhood gallery. Photos are displayed in their order of ranking or submitted date (newest first). The text "submitted by <userid>-pic no <picture id>" can briefly display for 1 second overlayed on the photo in the lower left corner. Ranking can be based on a photo score determined by subtracting the negative ratings from the positive ratings. Higher scoring photos rank highest. If photos have the same score, then submission date determines rank order with oldest being ranked higher. The default image can always display first, regardless of its rank. The data feed should provide the images in the correct rank order for display with the default image first. If the user mouses over the photo, the slideshow can stop and the mode can switch to Single Photo Browse.

In Single Photo Browse mode, a translucent toolbar can overlay on the photo. In this mode, "submitted by" text is not displayed at the bottom of the image but displays in the upper right. Only the picture id no needs to appear. When the user moves the mouse off the module, the module returns to Single Photo Slideshow mode after 2 seconds and the slideshow would resume with current photo being viewed. The toolbar can display forward and backward arrows, positive and negative voting buttons, a flag/report button, an upload button, a switch to Gallery Browse button, a my photos button, and close button. If the user is not signed in and has not joined the neighborhood, the upload, voting and my photos buttons can not display. The forward button replaces the current photo being displayed with the next photo in the gallery (based on the ranking order). If the end of the gallery is reached, the next photo can be the default photo. The gallery wraps from end to start. The back button replaces the current photo being displayed the previous photo in the gallery (based on the ranking order). If the beginning of the gallery is reached, the next photo can be the last in the gallery (lowest ranked). The gallery wraps from start to end. The positive voting button can increment the positive vote count for the displayed image. The user must be signed in and a member of the neighborhood to vote. Only one vote is allowed per global user identifier (guid)/user per photo. The negative voting button can increment the negative vote count for the displayed image. It follows the same voting requirements and rules as the positive voting button. The flag/report button can open a new window pre-populated with the photo id so that the user can report the image to a customer service representative. The upload button changes the module to Upload mode. The user must be signed in and a member of the neighborhood to upload. The My Photos button can switch the module to the My Photos Single mode. The user must be signed in and a member of the neighborhood for the My Photos button to display. The gallery icon button can switch the module to Gallery Browse mode with the current image being the first image in the gallery grid. The close button can hide the toolbar and return the module to Single Photo Slideshow mode.

When switching to upload mode, the toolbar disappears and the currently displayed image is hidden behind a transparent black background. Upload mode consists of a file upload text box, browse button to open a window to select a photo from the user's hard drive, a submit button to submit the form and a Cancel button. When the user clicks submit, the file can upload, the cancel button can be hidden and the module can display an uploading animation. Clicking the Cancel button returns the user to the Single Photo Browse mode. Images can be uploaded to a neighborhood server. Images can be saved to the neighborhood server as new image set of 400 pixels, 96 pixels, and 48 pixels (up to 400×400, 96×96, 48×48). The original aspect ratio of the source images can be maintained. Images can be scaled (down only) so that their largest dimension can equal 400 pixels. Images can have a 25 year expiration date set in the neighborhood server. It can be recommended to users to upload pictures with a 4:3 aspect ratio and larger than 400×300. Recommended size would be 640×480 or larger. A single user may only upload 10 pictures per neighborhood. This number can be read from the database. If the upload is successful, the module can switch to the Single Photo Browse mode and display the newly uploaded photo. If the user has reached their upload limit, the file upload elements would not be displayed. Instead, a message stating the user can only upload a maximum of 10 images can be displayed along with an OK button that when clicked can return the user to Single Photo Browse mode. If the upload is unsuccessful, a message stating that there was an error during upload, can appear along with an OK button. Clicking the OK button can return the user to the initial display of Upload Mode displaying the file upload interface.

A particular embodiment can also provide a photo gallery slideshow. Gallery Slideshow is functionally similar to the Single Photo Slideshow except that instead of displaying a single photo a grid of 12 (4×3) photos can be displayed. Photos are displayed in rank order (with the default image first) starting in the upper left corner. Submitted-by text cannot display in this mode. Every 3 seconds the photos change to the next 12 photos in the neighborhood's gallery. If the user mouses over the area, the slideshow can stop and the mode can switch to Gallery Browse.

A particular embodiment can also provide a photo gallery browse function. Gallery browse is functionally similar to Single Photo Browse except where noted. The toolbar displays over a grid of photos instead of a single photo. When the user moves the mouse off the module, the module returns to Gallery Slideshow mode after 2 seconds and the slideshow resumes with the current grid of photos being viewed. The toolbar displays the switch to Single Photo Browse button instead of the Gallery Browse button. The forward button advances up to the next 12 pictures in the gallery. The back button displays up to the previous 12 pictures in the gallery. Voting buttons and Report/flag buttons are not displayed. The My Photos button switches the module to My Photos Gallery mode. Clicking a photo displayed in the grid can switch to Single Photo Browse mode with the image clicked upon being displayed. The Single button can switch the module to Single Photo Browse mode with the first image in the grid displayed. The Close button hides the toolbar and returns the module to Gallery Browse mode.

In My Photos mode, the module displays only photos uploaded to the neighborhood by the user. My Photos mode is functionally almost the same as Single Photo Browse. The photos are displayed in the order uploaded by the user with newest photos first. The first photo displayed upon entering this mode is the last photo uploaded by the user to this neighborhood. The forward and backward arrows can navigate through the user's uploaded photos one photo at a time. The toolbar can not display voting or reporting buttons in this mode. Clicking the Close button can return the user to Single Photo Browse starting at the image displayed previously before entering My Photos Single mode. The toolbar can display a Delete button. Clicking the Delete button removes the currently displayed image from the neighborhood's gallery and the list of photos uploaded by this user. Clicking the Gallery button switches the module to My Photos Gallery Mode.

In My Photos Gallery mode, the module displays only photos uploaded to the neighborhood by the user. My Photos Gallery mode is functionally almost the same as Gallery Browse. Photos are displayed in a grid of 12 (4×3). The photos are displayed in the order uploaded by the user with newest photos first in the upper left corner. The first photo displayed upon entering this mode is the last photo uploaded by the user to this neighborhood. The forward and backward arrows can navigate through the user's uploaded photos 12 photos at a time. The toolbar can not display voting or reporting buttons in this mode. Clicking the Close button can return the user to Gallery Browse starting at the image displayed previously before entering My Photos Gallery mode. The toolbar can NOT display a Delete button. Clicking a photo switch the module to My Photos Single mode with the clicked photo being displayed. Clicking the Single button can switch the module to My Photos Single mode with the image displayed being the first image in the current grid.

The photos module can also include a Data Warehouse for retaining various sets of metrics. Data Warehouse reports can be generated for the following: Report of the number of images uploaded per week per neighborhood; Report of the total number of images uploaded per week/month to all neighborhoods for a given site; Report of the total images per week/month for each neighborhood; Report of the total images per week/month for all neighborhoods for a site; Report on number of votes cast for images per week per neighborhood; Report on number of votes cast for images across all neighborhoods for a site per week/month; Report on the number of unique users voting for images per week/month; Report on the number of images viewed per neighborhoods per week/month.

—Related Neighborhoods

The related neighborhoods module is displayed on each neighborhood page. The module uses a rich, interactive display to present data from a back end feed. The data feed takes as input parameters either a neighborhood identifier or a keyword along with the maximum number of related neighborhoods to return. In one embodiment, the output can be XML data for the highest scoring related neighborhoods based on a related neighborhoods algorithm. In other embodiments, the output can be in other formats or protocols suitable for a particular application.

In other embodiments, other visualizations of the related neighborhoods can be done. In a particular embodiment, the "main" neighborhood can be displayed as a large "flower" image (neighborhood 910 shown in FIG. 9) with "leaves" that show data elements (elements 911-915 shown in FIG. 9) about the neighborhood and its related photo (image 916 shown in FIG. 9). In one embodiment, the related neighborhoods (neighborhoods 920 and 930 shown in FIG. 9) can appear as other "flowers" in the same "pot". See the example shown in FIG. 9. In other embodiments, the related neighborhoods can be shown with petals and leaves to provide further dimensions associated with a particular neighborhood. Color, size, clarity, shape, and relative distance can be varied to show distinctions among the related neighborhoods and how closely related they are to the main neighborhood. Mousing over the related neighborhoods draws the related neighborhoods into focus and displays additional information—e.g. name, number of members in common. Clicking the related neighborhood re-draws the information with the neighborhood clicked on now being the "main" neighborhood. In another variant, clicking the neighborhoods in the related neighborhood module actually navigates the page to that neighborhood.

A sample XML format in a particular embodiment can be:

```
<neighborhood>
<neighborhoodid>1</neighborhoodid>
<members>345</members>
<activitylevel>3</activitylevel>
<posts>34</posts>
<name>Camping</name>
<defaultimageurl>http://imageurl</defaultimageurl>
<score>1</score>
<commonmembers>345</commonmembers>
<url>http://neighborhoods.host_site.com/camping/</url>
<center>yes</center>
</neighborhood>
<neighborhood>
<neighborhoodid>4</neighborhoodid>
<members>67</members>
<activitylevel>5</activitylevel>
<posts>3465</posts>
<name>Fishing</name>
<defaultimageurl>http://imageurl</defaultimageurl>
<score>0.34</score>
<commonmembers>45</commonmembers>
<url>http://neighborhoods.host_site.com/fishing/</url>
<center>no</center>
</neighborhood>
```

The <center> data is used by the display logic to determine which neighborhood can be at the center of the visualization with the other neighborhoods shown as spokes. The <defaultimageurl> is used for the background image associated with each neighborhood. It would be the default image for the neighborhood. The <score> value is the relatedness of the neighborhood to the center neighborhood. The <commonmembers> value is the number of members who have joined both the neighborhood and the center neighborhood.

The process for determining and identifying the related neighborhoods in a particular embodiment is used to determine the relatedness score between neighborhoods. This determination process can include factors such as neighborhood memberships in common, favorite searches, site queries, and buying/selling activity. In a particular embodiment, the related neighborhoods determination process used can be to run the list of neighborhoods through a keyword analysis to determine converting keywords that are also neighborhoods. The data can be based on six months (for example) of site activity. The relatedness score can be the number of bids+bins for the converted word/bids+bins for the starting word. This would result in the actual neighborhood itself having a relatedness score of 1.0. For example) adidas has 27052 bids+2604 bins=29656 and the converted keyword nike (for adidas) has 2476 bids+231 bins=2707 so the relatedness score for adidas to nike is 2707/29656=0.09. While puma has 1895 bids+133 bins=2028 for a score of 2028/29656=0.068. So "adidas" is more closely related to "nike" than to "puma". The related neighborhoods scores can be pre-computed and saved in a data store; because, they only need to be refreshed periodically. In a particular embodiment, the data store can contain up to the four highest scoring related neighborhoods for each neighborhood.

In another embodiment, the related neighborhoods determination process can include a method of calculating or adjusting relatedness scores based on common memberships. For example, assume we have a set of neighborhood memberships with the following characteristics: 1) Neighborhood A with 400 members, 2) Neighborhood B with 100 members, 60 of which are also members of Neighborhood A, and 3) Neighborhood C with 50 members, 10 of which are also members of Neighborhood A. The related neighborhoods determination process can use this membership information to generate a base neighborhood's directional relatedness to other neighborhoods. This relatedness corresponds to a score that can be computed as the number of common members of a neighborhood divided by the total number of members of the base neighborhood. Given the sample set of neighborhood membership characteristics set forth above, this relatedness score can be computed as in the examples that follow:

Neighborhood A's relatedness to Neighborhood B is 60/400=0.15

Neighborhood A's relatedness to Neighborhood C is 10/400=0.025

Neighborhood B's relatedness to Neighborhood A is 60/100=0.60

Figure 9:
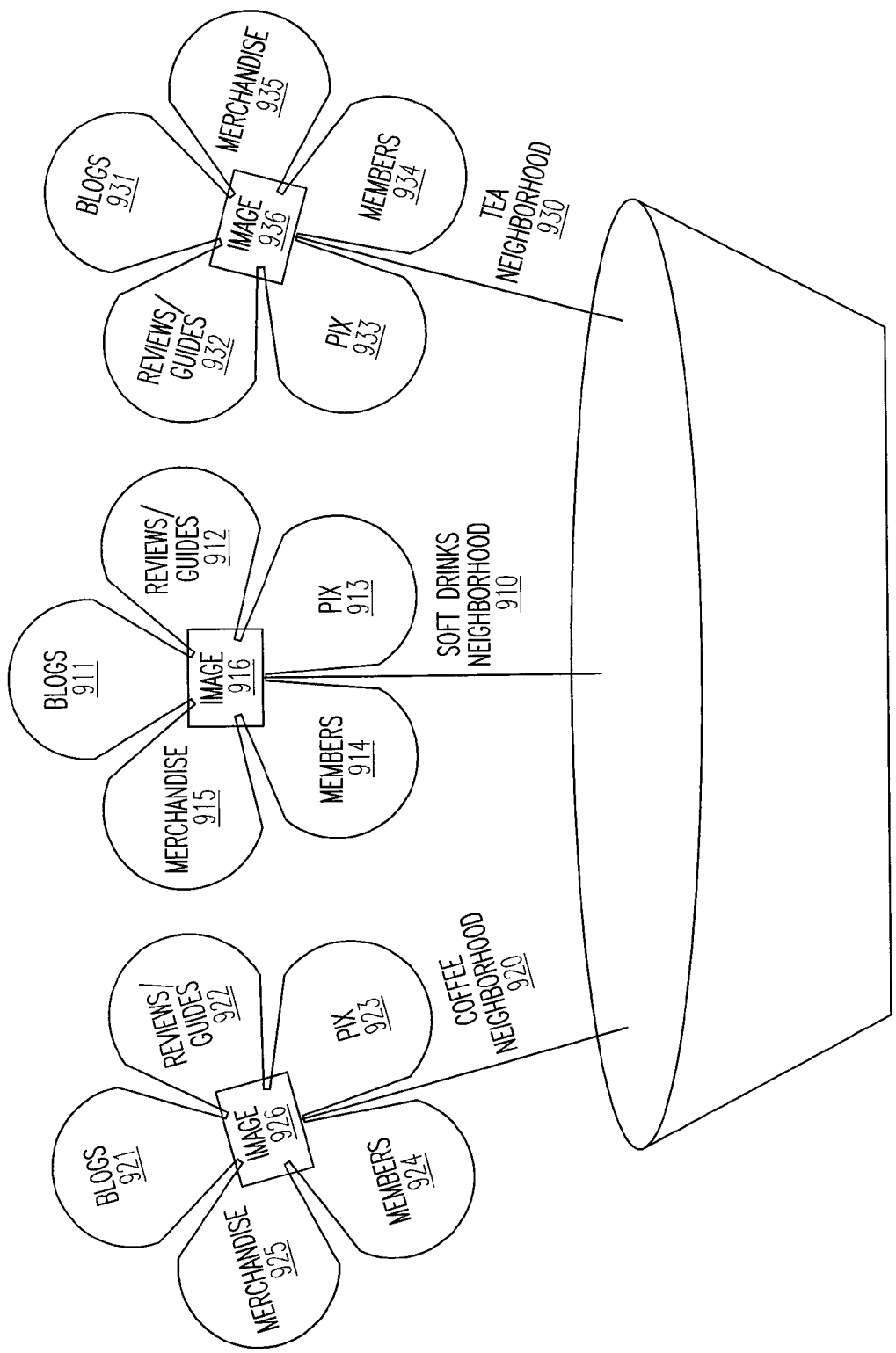
FIG. 9 illustrates a visualization of a plurality of related neighborhoods in an example embodiment.

Having computed the neighborhood relatedness scores, the neighborhood visualization, such as the one shown in the example of FIG. 9, can be adjusted to conform to the neighborhood relatedness scores. For example the color, size, clarity, shape, and relative distance of the neighborhood images can be varied proportionally to the neighborhood relatedness scores to show distinctions among the related neighborhoods and how closely related they are to the main neighborhood.

The related neighborhoods module displays the neighborhoods as nodes linked to a center node (a network visualization). Representative example sites include:

a. http://www.ponderbox.com/experimental/network_navigation.php b. http://www.etsy.com/connections.php c. http://getoutfoxed.com/visualization Size (circumference) of the nodes is determined by the number of members in that neighborhood. The length of the links between nodes is determined by the relatedness scores between the node and the center node. High scores representing a stronger relationship result in shorter links. Alternatively, the thickness of the link could represent a stronger relationship. Each node can display its neighborhood's name. Mousing over a node can display a popup showing the number of members in the neighborhood and the activity level. Mousing over a branch can display a popup showing the number of common members between the two neighborhoods. Clicking a node can move that node to the center of the display and then draw the neighborhoods connected to it. The other nodes displayed can adjust position accordingly. Double-clicking a node can navigate the user to the neighborhood URL associated with that node. Nodes may use their neighborhood's default image for their background. A Browse Full Screen link can expand the Related Neighborhoods display to fill the screen. No more than four nodes can be shown connected to another node. This number is determined by the back end. The front end can display as many nodes as are returned.

A particular embodiment can include a related neighborhoods batch job. The Related Neighborhoods batch job takes an Excel spreadsheet as input and uses it to populate the contents of the related neighborhoods table. The spreadsheet can contain the neighborhood id, the related neighborhood id, and the score. The score can be an integer value between 0 and 10000.

—Title and Join Neighborhood Module

The title and join neighborhood module displays the name of the neighborhood as retrieved from the database. The title and join neighborhood module also retrieves the number of users who have joined the particular neighborhood from the database. Display of the membership count can be configurable and defaulted to not display.

The title and join neighborhood module also provides the functionality to enable users to join a neighborhood. The title and join neighborhood module can be used to display a join neighborhood widget on the neighborhood page. In a particular embodiment, there can be 3 hyperlinks on the Join neighborhood widget as specified below.

Invite a friend
Suggest a Neighborhood to host site
What's a Neighborhood

A "Join This Neighborhood" button can be displayed. Display Properties for all signed in and joined members of this neighborhood can also be displayed. In a particular embodiment, there can be a dropdown list displaying all the names of the neighborhoods for the current site that the user has joined. The current neighborhood name can be the selected item in the drop down list. The items in the drop down list can be arranged alphabetically. The user can select any of the neighborhoods on the dropdown list and can be redirected to the selected neighborhood page. If there is an error in fetching the user's neighborhood list, then a message can be displayed "Sorry, we couldn't display your Neighborhoods now". The display can be plain text and can appear instead of the drop down list.

If the user is signed in and in good standing (confirmed registered user and not suspended) and they click the Join button, they can be automatically joined to the neighborhood and can remain on the current page. If the user is not registered/signed in and clicks the Join button, the user can be taken to the registration/sign-in page and on successful registration/sign-in can be automatically joined to the neighborhood (if possible—otherwise the user may need to click Join again after having signed in). The user can be automatically brought back to the neighborhood page. On successfully joining a neighborhood, the Join button can be replaced with the view described in "Display properties for all signed-in and members of this neighborhood". If there is an error during the join process, a plain text message should display "Sorry we couldn't join you to the neighborhood now." in the area normally occupied by the Join button. A user should still be able to join a Neighborhood if they have Javascript turned off.

On click of the Invite a friend link, a pop-up form can be displayed if the user is signed in. If the user is not signed in/registered and clicks the Invite a friend link, the user can be re-directed to sign-in/register flow and after registration/signing in the user can be brought back to the same neighborhood page, and the pop-up form can be automatically displayed. The pop-up for "Invite a friend" can be displayed as a layer on top of the existing neighborhood page. The form can contain fields to enter the friend's email address and a welcome message. The form format can be similar to the 'Email to a friend' format. There can be a pre-populated welcome message that can be edited by the user. The maximum size for the welcome message is 4000 characters (no HTML, JS, asterisks or quotes allowed). The actual email sent by the form can contain additional text that is not displayed on the form. The email can contain a link that can bring the friend to the neighborhood page from which the email was generated. The default picture for the neighborhood can be displayed in the email along with additional text. There can be a pre-populated subject line for the email. The subject cannot be edited by the user. There can be a TO field where the user can enter only 1 email address at a time. A maximum of 50 characters is allowed. There can be a disclaimer—'host site won't use this address for promotional purposes, or disclose it to a third party'. The mail can display the user's registered email ID in the FROM field. There can be a check for the email address format (*@*.*). There can be a Send Message Button that when clicked can perform error checks on the form, and if passed successfully, can send the email and close the form. Any submission errors can be displayed in-line in the form. There can be a Cancel Button, which can close the pop-up form and not send the email. The user can remain on the neighborhood page after submission or cancellation and the pop-up can close. There can be a provision for turning off the Invite a friend feature (Partner Contingency). If the user has JS turned off, they can not be able to use this feature. There can be a limit of 10 emails invites sent per user per Neighborhood per day.

On click of the 'Suggest a Neighborhood link', if the user is signed in, a pop-up form can be displayed. On click of the Suggest a Neighborhood link, if the user is not signed in/registered, the user can be re-directed to the sign in/registration page. After registration/signing in the user can be brought back to the same neighborhood page, and the pop-up form can be automatically displayed. The pop-up can be displayed as a layer on top of the existing neighborhood page. In a particular embodiment, the 'Suggest a Neighborhood' form can contain 4 fields (input type: plain text only, no HTML, JS, asterisks or quotes allowed) as specified below.

Neighborhood Name (maximum 100 characters)
Short Description (maximum 500 characters)
Key words describing the Neighborhood (5 keywords, each of maximum 50 characters)
Why is this neighborhood important to you? (maximum 500 characters)

The maximum characters allowed can be displayed for each field. The number of characters remaining can be displayed for the Neighborhood Name, Short Description and the text field for 'why is this neighborhood important to you?' as the user types into the text fields. The 'Neighborhood Name' and 'Short Description' fields are required; 'Key words describing the neighborhood' and 'why is this neighborhood important to you' fields are optional. The form should have a (*) next to the Neighborhood Name and Short Description fields to indicate they are required. There can be a SUBMIT and CANCEL button. When the user clicks SUBMIT, the form can check if all the required fields are populated. If some required fields are unpopulated, then an inline error message can be displayed in the form, 'Error message text'. If the form is submitted successfully, the data can be saved in the database. The form can close and the user can remain on the neighborhood page. If there is an error saving the data, an error message can be displayed in the form, 'Error message text'. If the user clicks the CANCEL button, the form can close and no suggestion can be sent to host site. The submitted data can be stored along with the user's userid, site id, the neighborhood id (if present), the date and time of submission, and the user's email address (if possible). There can be a provision for turning off the Suggest a Neighborhood function (Partner Contingency). If a user has JS turned off, they cannot use this feature. A user should not be able to send more than a total of 50 'Suggest a Neighborhood' messages (total across all sites) in a given 24 hour period.

On mouse over of the 'What's a Neighborhood' (aka Help) link and icon, a small pop-up window can be displayed showing some text describing what a neighborhood is. Also, a More link can be displayed. On clicking the More link or the Help link, the user can be taken to the Neighborhood Help pages in the Help section of the site.

—Neighborhoods Search Module

This section describes the functionality of an example embodiment of the Neighborhoods Search Module and the Results page produced thereby. The URL for the Neighborhood Search Results page can be the site specific equivalent of http://search.neighborhoods.host_site.com. Page title can be "host site Neighborhoods—<query string>". Meta tags for description can be "host site Neighborhoods provide host site members with an area to discuss topics and products of shared interest." Meta tags for keywords can be "<query string>, neighborhoods, host site, host site Neighborhoods, neighborhood, host site Neighborhood". Site catalyst variables can be: var pageName="Neighborhoods_Search", var pageID="NeighborhoodsSearch". Breadcrumbs for the page can be Home (linked to site specific version of http://www.host_site.com >Community (linked to site specific version of http://hub.host_site.com/community)>Neighborhoods (linked to the site specific version of http://neighborhoods.host_site.com)>Search Results (no link). The Neighborhoods Search Results page can take as input a query string up to 60 characters in length. A text input box allowing for 60 characters of input can be displayed and pre-populated with the query passed in. A Search button submits the query in the text box to the "search for a neighborhood" back end and refreshes the Neighborhood Search Results page. If a query is passed in to the page, the results for the associated query can display. The search can do a case insensitive query against the Neighborhood display names and their associated keywords for the current site. Neighborhood display names and keywords can be indexed "as is" from the Neighborhood data model. No query language or qualifiers can be used in the query string. The search back-end can first attempt to find exact matches for the query. Common articles such as "a", "an", "the" can be ignored using the functionality already found in the search back-end. If no exact matches are found, then the back-end can spell correct the query keywords and attempt an exact match again. In this case, the page should display the following message with the "I" icon —"We couldn't find a match for your search so we tried <spell corrected term>". The spell corrected term should also replace the original query term in the title bar. After searching for the exact matches, the back-end can attempt to find partial matches using an OR search. If there are still no matches, then the message 'Your search for <query> returned zero results." should display and the back-end should also show a Suggest a Neighborhood link and display alternate search terms (from the SIBE alternate searches) for the query keywords. Each of the alternate search terms can be a link to the Neighborhood Search Results page for the term. A Browse All Neighborhoods link should also appear. If there is an error fetching results, the following message should display "There was an error fetching the matching neighborhoods." The total number of results found can be displayed. Results can be paginated and up to 25 results can displayed on a single page. Each result returned can be the display name of the neighborhood (linked to its associated neighborhood page), its default picture (48×36 size) and also show the current number of members in the neighborhood, and the current number of posts in the neighborhood's discussion board (if possible). The page count for each neighborhood can also be kept but not displayed as can the neighborhood creation date and time. The neighborhood type should also be part of the search index as it may be used to help organize results. The display name may contain non-ASCII characters such as Chinese or accented characters. The link however, must be ascii characters valid for URLs. This is similar to how host site Stores links are handled. If the member or posts counts are zero, they should still be displayed. The picture can be top aligned and centered horizontally and scaled so that its width fits the column. The picture's original aspect ratio can be maintained. The default sorting of the results can be Exact Match. In this sort order, the results from the exact match query are first displayed and then followed by the results from the from the partial match query (with duplicate results thrown out). No separator or indicator can be used to identify the two groups. Within each group, the results are ordered by the largest number of members first. The user can be able to change the sorting options via a Sort By drop down. Selecting a new sort can re-order the results. The options are Exact Match, Membership (largest number of members first), Activity (largest number of discussion board posts first), Popularity (largest number of page views), and Alphabetical. Using sorting options other than Exact Match can result in a list of results where partial and exact matches are mixed together.

—Suggest a Neighborhood Module

In a particular embodiment, describes the functionality of an example embodiment of modifying the Related Guides widget on Finding pages so that it can also display Suggested Neighborhoods. This module is currently used on DLPs and Search Results pages (both classic and new). The related guides widget takes as input a string of up to 60 characters in length that is passed into the widget from the page hosting the widget. The widget may be hosted on any host site page but is typically located on pages that are associated with a keyword. This keyword is used as the input to the widget. The widget displays a configurable number of results. The default number of results to display is 6. Up to the configured number of results can be displayed. If there are no results, the widget can not display. If there is an error fetching the results and no results can be displayed at all, the widget should not display. The widget can first attempt to query the Neighborhood Search backend using the keyword(s). If the configured number of results or less are found then the widget can also attempt to query the Guides Search backend using the keyword(s). If the result set is all Neighborhood results, then the title of the widget can be "Related Neighborhoods". Each result returned can display the name of the neighborhood (linked to its associated neighborhood page), the neighborhood default photo (linked to its associated neighborhood page), and the count of the total number of members and total number of posts in the neighborhood. The default sorting/ordering of the results can be exact matches and then partial matches and within each ordered by the largest number of members first. This is the Exact Match sort from the Search for a Neighborhood page (see Neighborhoods Search module for more information). If more results are returned than are configured to display, then a "See all" link can be displayed that links to the Neighborhood Search Results page for the associated query. The appropriate size of the default image for the neighborhood can be used. If the result set is a mix of Neighborhood and Guides results, then the title of the widget can be "Related Neighborhoods". Neighborhood results can be displayed first according to the logic described above. A separator in a visual style similar to the title can be placed between the Neighborhoods and Guides results. The separator text can be "Related Guides". Below the separator, the Guides results can be displayed as the names of the guides with each linking to the associated guide page. The display and ordering/sorting logic for guides should follow the logic in the existing widgets. Only up to the number of Guide results required to reach the configured total number of results can be displayed (number neighborhoods+number guides=total configured number of results to display). If there are more Guides results than can be displayed, then a "See all" link to the Guides Search Results page for the guides query can be displayed. If the result set is all Guides results, then the title of the widget can be "Related Guides" and the display of results can not be modified from the existing functionality.

Examples of how the widget can display are shown below.
      6 Neighborhood results (or more)=>only displays Related Neighborhoods, Related Guides does not display
      5 Neighborhood results=>only displays Related Neighborhoods, Related Guides does not display
      4 Neighborhoods results=>displays Related Neighborhoods and up to 2 Related Guides displays
      3 Neighborhoods results=>displays Related Neighborhoods and up to 3 Related Guides displays
      2 Neighborhoods results=>displays Related Neighborhoods and up to 4 Related Guides displays
      1 Neighborhoods results=>displays Related Neighborhoods and up to 5 Related Guides displays
      0 Neighborhoods results=>do not display Related Neighborhoods, 6 Related Guides displays —Site Integration This section details how Neighborhoods can be integrated into various other host site pages. A link to the Neighborhoods Hub page (http://neighborhoods.host_site.com) can be added to the Global Navigation function of a particular host site. The link text can be "Neighborhoods" or "My Neighborhoods", such as shown in FIG. 2. In a particular embodiment, a host site can provide a My World page, such as the page shown in FIG. 5. The My World page can include a My World: Add Content function to enable the user to create a link 505 to a neighborhood. When a user is signed in and viewing their own My World page, the page may have an 'add content' link. Clicking this link can take the user to an Add Content page. The Add Content page can be modified to include a Neighborhoods module. The label can be "Neighborhoods" with the sub-heading of "Display your neighborhoods." An icon representing neighborhoods can also be displayed. If a user has not yet added the Neighborhoods module, the Neighborhoods module can display in the More Modules section of the page with an "Add" link. Clicking the "Add" link cause the Neighborhoods module to be displayed on the user's My World page. The immediate results of clicking the link are that the Add Content page can refresh and show the module moved from More Modules to the Your Modules section. When displayed in the Your Modules section, the same label, sub-heading, and icon can display. There can be a Remove link and Edit link. Clicking the Remove link can cause the Neighborhoods module to be removed from their My World page. The immediate results of clicking the link are that the Add Content page can refresh and show the module removed from the Your Modules section and added back to the More Modules section. The Neighborhoods module (when present) should display at the top of the list of modules in the Your Modules and More Modules sections.

The public view of a user's My World page is accessed when a user views any other users My World page (or the owner of the page is signed out and views their own My World page). If the owner of the page had added the Neighborhoods module to their My World page, it can be displayed in the position they selected or the default position. The Neighborhoods module can display up to the configured number of names of the Neighborhoods from the current site that the user has joined. Ordering of the display of the neighborhoods can based on the display order configured earlier (or the default—Most Recently Joined first). Each Neighborhood name can be a link. The name can link to the Neighborhood page itself. The number of members in each displayed Neighborhood can appear next to the Neighborhood name. If the user has not checked the "Do not display neighborhood pictures" option, the default picture for each Neighborhood can display. The picture can link to the Neighborhood. The picture size used can be 50 pixels wide. If there are no Neighborhoods that the user has joined, the following message can display in the module—"This user has not joined any neighborhoods."

Figure 6:
FIG. 6 illustrates an example of the Edit link in an example embodiment.

The private view of the user's My World page is accessed when the user is signed in and viewing their own My World page. If the user has added the Neighborhoods module to their My World page it can display exactly as in the My World Public View except that the module header can contain a link "Edit" that can take the user to the Edit Neighborhoods module page and a close box can be displayed. Clicking the close box can remove the module from the My World page. The close box is the equivalent of the Remove link on the Add Content page. If there are no Neighborhoods that the user has joined, the following message can display in the module— "You currently have not joined any Neighborhoods. Find a neighborhood." This can be a link to the Neighborhood Hub page (http://neighborhoods.host site.com). An 'Edit Neighborhoods' module page is only available when a signed in user chooses to edit their own Neighborhoods module. The page title can be "host site My World—<userid>". The standard page level header for the My World edit pages can be used and it can display in the user's selected theme color. The label can be "Edit neighborhoods module". Below the label, the following text can appear "This module can automatically display the neighborhoods you have joined." There can radio button title "Display order". The list can have items—Name (alphabetical), Number of Members (larger display first), Most Recently Joined, and Joined longest ago. The selection of any of the values can display the Neighborhood names in the My World page by selected order. The default value is Most Recently Joined. There can be a drop down list titled "Number of neighborhoods to display". This can have values 1-10. The user can select any of the value. This can define the maximum number of Neighborhoods displayed in the Neighborhoods module on the My World page. The default value is 5. There can be a checkbox with the label "Do not display Neighborhood picture". If this button is checked, the Neighborhoods can display without their pictures when the Neighborhoods module is on the My World page. The default is unchecked. There can be a SAVE link. On click all the selections can be saved and the user can be brought back to where they clicked the Edit link for the Neighborhood module (either their My World page or the Add Content page). There can be a CANCEL link. On click of the CANCEL link, none of the selections are saved and the user can be brought back to where they clicked the Edit link for the Neighborhood module (either their My World page or the Add Content page). FIG. 6 illustrates an example of the Edit link 605 in an example embodiment.

The Change Layout page is only available when a signed in user clicks the Change Layout link from their own My World page. If the user had not previously added the Neighborhoods module, the default position of the Neighborhoods module can be in the right column for the 2 column layout and in the middle column for the 3 column layout. If the user has previously added the Neighborhoods module to their My World page, the module can display in its current position in the layout. The user can be able to position the Neighborhoods module in any of the available columns.

—APIs

Various embodiments include an application programming interface (API) for neighborhoods. GetUser and GetUserProfile calls can be modified to return the complete list of Neighborhoods that the requested user has joined. Live World can use this information to authenticate a user on to discussion boards for Neighborhoods. After a user has finished paying for an item and is on the last page of the new checkout flow, related Neighborhoods content can be displayed. Each suggested neighborhood can display the name of the neighborhood as a link to the neighborhood and may display the number of members and the 50 pixel size of the default picture for each neighborhood if so configured.

Figure 7A:
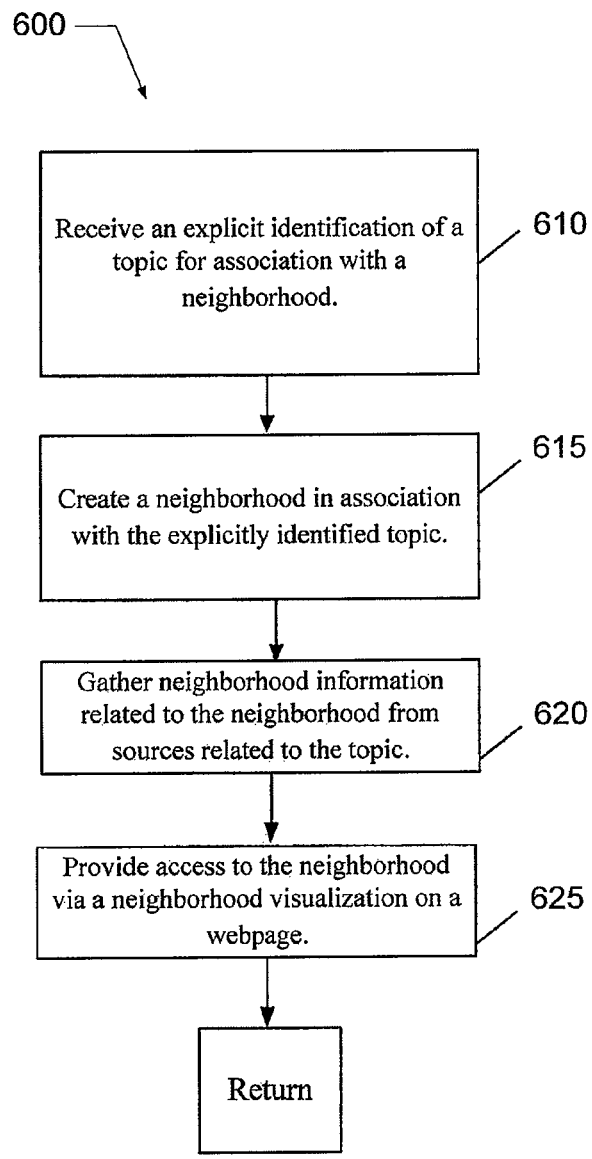
FIGS. 7A and 7B are processing flow diagrams of an example embodiment.

FIG. 7A is a processing flow diagram of an example embodiment. In the example embodiment, a method includes receiving an explicit identification of a topic for association with a neighborhood (processing block 610), creating a neighborhood in association with the explicitly identified topic (processing block 615); gathering neighborhood information related to the neighborhood from sources related to the topic (processing block 620), and providing access to the neighborhood via a neighborhood visualization on a webpage (processing block 625). The method may include an implementation wherein the information sources include at least one item of the group: merchandising, blogs, guides, reviews, people, and photos.

Figure 7B:
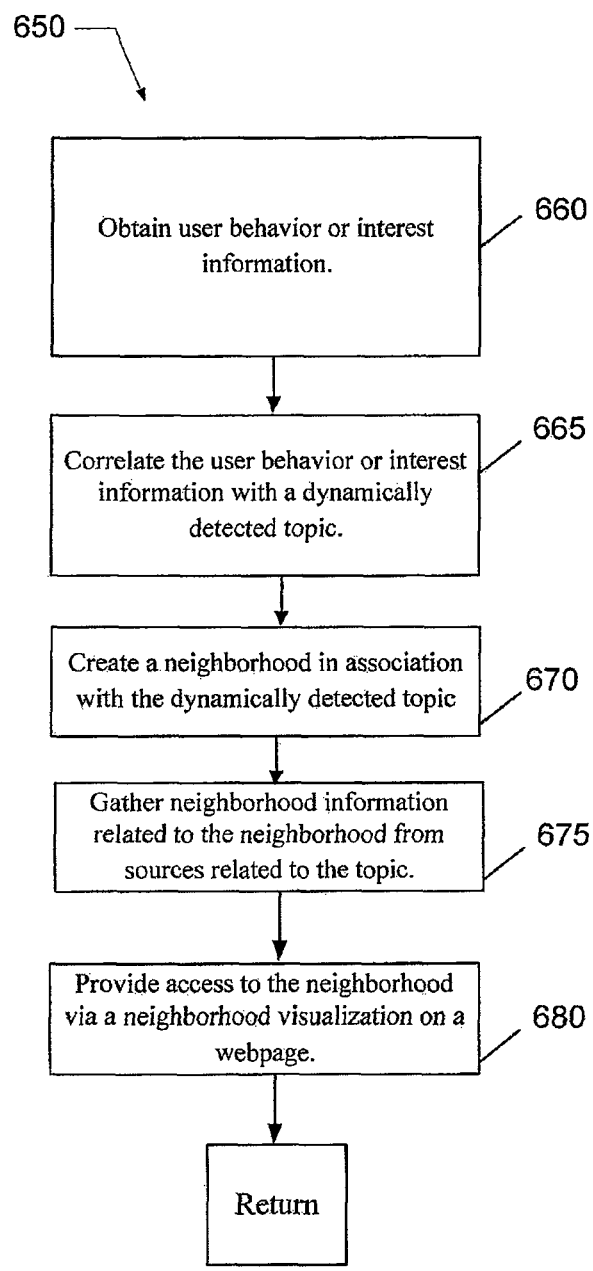

FIG. 7B is a processing flow diagram of an example embodiment. In the example embodiment, a method includes obtaining user behavior or interest information (processing block 660), correlating the user behavior or interest information with a dynamically detected topic (processing block 665); creating a neighborhood in association with the dynamically detected topic (processing block 670); gathering neighborhood information related to the neighborhood from sources related to the topic (processing block 675), and providing access to the neighborhood via a neighborhood visualization on a webpage (processing block 680). The method may include an implementation wherein the information sources include at least one item of the group: merchandising, blogs, guides, reviews, people, and photos.

Figure 8:
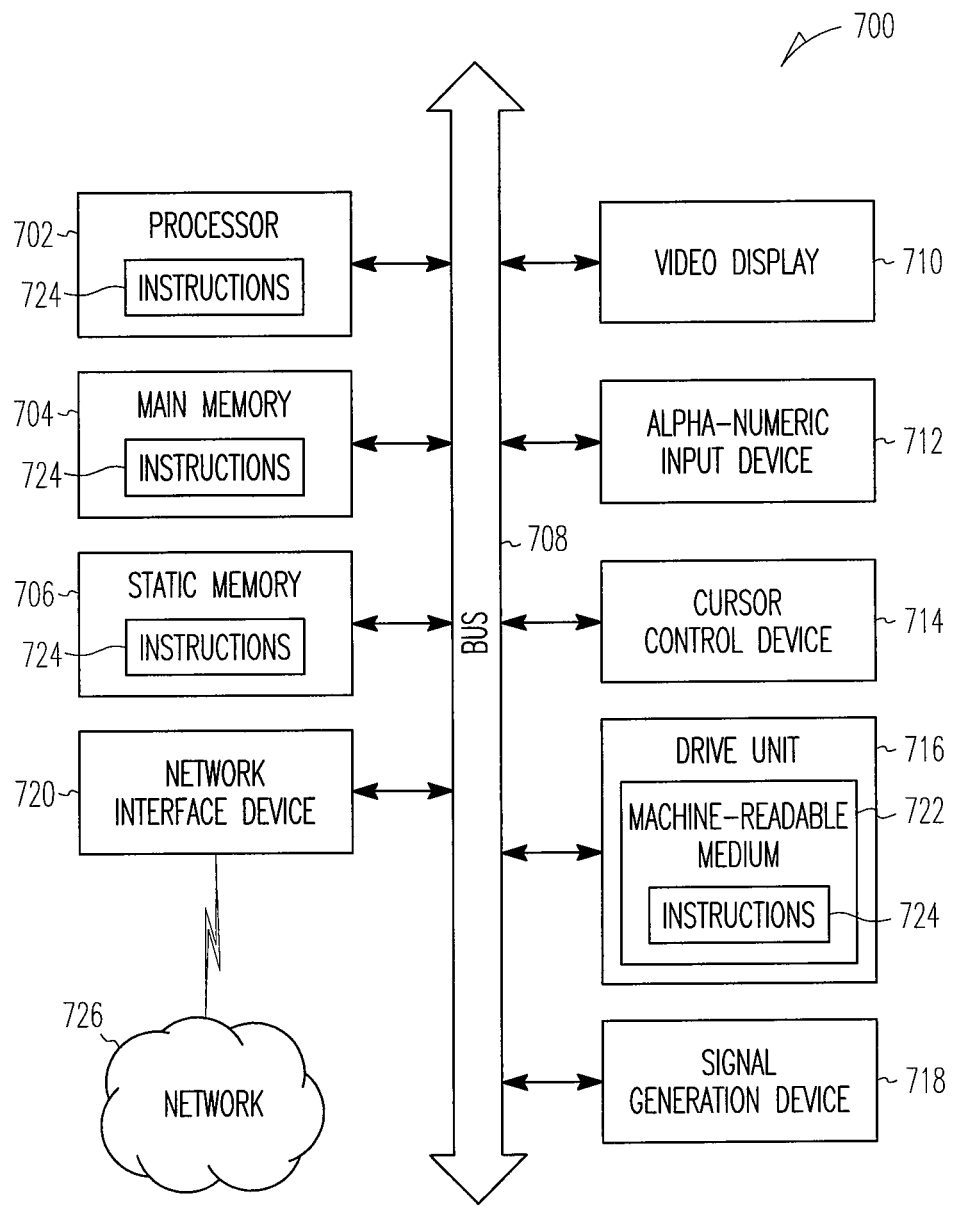
FIG. 8 shows a diagrammatic representation of a machine in the form of a computer system within which a set of instructions, for causing the machine to perform any one or more of the methodologies discussed herein, may be executed, according to an example embodiment.

FIG. 8 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories,optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

The system of an example embodiment may include software, information processing hardware, and various processing steps, which are described herein. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described herein. In particular, the use of embodiments with various types and formats of user interface presentations and/or application programming interfaces may be described. It can be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

Thus, a computer-implemented system and method for creating topic neighborhoods and a visualization for related topic neighborhoods in a networked system are disclosed. While the present invention has been described in terms of several example embodiments, those of ordinary skill in the art can recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
obtaining user behavior or interest information based on automatically detected patterns of user behavior, the user behavior including prior user search queries; correlating, by use of a hardware processor, the user behavior or interest information with a dynamically detected topic;
creating a neighborhood implicitly in association with the dynamically detected topic, the neighborhood defining a group of users who share an interest or behavior; gathering neighborhood information by using the dynamically detected topic as a search term to search from sources including information related to the dynamically detected topic, the neighborhood information including information from a related neighborhood determined based on participation of the group of users in the related neighborhood; automatically inviting users to join the implicitly created neighborhood; and providing access to the neighborhood via a neighborhood visualization on a webpage.

2. The method as claimed in claim 1 wherein the neighborhood information sources include at least one item of the group: merchandising, blogs, guides, reviews, people, and photos.

3. The method as claimed in claim 1 including inviting users to suggest additional neighborhood content sources for the neighborhood.

4. The method as claimed in claim 1 including inviting users to vote for a favored neighborhood.

5. The method as claimed in claim 1 wherein the neighborhood visualization includes displaying the neighborhood as a large flower-shaped image with leaves that show data elements related to the neighborhood.

6. An apparatus comprising:
a processor;
a memory coupled to the processor;
a neighborhood generator, stored in the memory, and that, executed by the processor, is configured to:
obtain user behavior or interest information based on automatically detected patterns of user behavior, the user behavior including prior user search queries; correlate the user behavior or interest information with a dynamically detected topic; create a neighborhood implicitly in association with the dynamically detected topic, the neighborhood defining a group of users who share an interest or behavior; gather neighborhood information by using the dynamically detected topic as a search term to search from sources including information related to the dynamically detected topic, the neighborhood information including information from a related neighborhood determined based on participation of the group of users in the related neighborhood; automatically invite users to join the implicitly created neighborhood; and provide access to the neighborhood via a neighborhood visualization on a webpage.

7. The apparatus as claimed in claim 6 wherein the neighborhood information sources include at least one item of the group: merchandising, blogs, guides, reviews, people, and photos.

8. The apparatus as claimed in claim 6 being further configured to invite users to suggest additional neighborhood content sources for the neighborhood.

9. The apparatus as claimed in claim 6 being further configured to invite users to vote for a favored neighborhood.

10. The apparatus as claimed in claim 6 wherein the neighborhood visualization being further configured to display the neighborhood as a large flower-shaped image with leaves that show data elements related to the neighborhood.

11. An article of manufacture comprising a non-transitory machine-readable storage medium having machine executable instructions embedded thereon, which when executed by a machine, cause the machine to:

obtain user behavior or interest information based on automatically detected patterns of user behavior, the user behavior including prior user search queries; correlate the user behavior or interest information with a dynamically detected topic; create a neighborhood implicitly in association with the dynamically detected topic, the neighborhood defining a group of users who share an interest or behavior; gather neighborhood information by using the dynamically detected topic as a search term to search from sources including information related to the dynamically detected topic, the neighborhood information including information from a related neighborhood determined based on participation of the group of users in the related neighborhood; automatically invite users to join the implicitly created neighborhood; and provide access to the neighborhood via a neighborhood visualization on a webpage.

* * * * *